United States Patent
Reynolds

(10) Patent No.: US 8,417,733 B2
(45) Date of Patent: *Apr. 9, 2013

(54) DYNAMIC ATOMIC BITSETS

(75) Inventor: Nathan Reynolds, Mesa, AZ (US)

(73) Assignee: Oracle International Corporation, Redwood Shores, CA (US)

(*) Notice: Subject to any disclaimer, the term of this patent is extended or adjusted under 35 U.S.C. 154(b) by 429 days.

This patent is subject to a terminal disclaimer.

(21) Appl. No.: 12/717,917

(22) Filed: Mar. 4, 2010

(65) Prior Publication Data

US 2011/0219209 A1 Sep. 8, 2011

(51) Int. Cl.
*G06F 17/30* (2006.01)

(52) U.S. Cl.
USPC ........... 707/801; 707/814; 711/154; 711/202; 712/16; 714/15; 714/16

(58) Field of Classification Search .................. 707/704, 707/745, 801, 807, E17.051; 711/213, 214, 711/219, 220, 202, 154, E12.001; 718/100, 718/107, 108; 710/200, 240; 717/125; 719/310, 719/340; 714/15, 16, E11.114, E11.115; 712/16, E09.019, E09.02
See application file for complete search history.

(56) References Cited

U.S. PATENT DOCUMENTS

| | | | | |
|---|---|---|---|---|
| 4,922,415 A * | 5/1990 | Hemdal | ........................ | 711/206 |
| 6,148,316 A * | 11/2000 | Herbert et al. | ................ | 708/505 |
| 6,535,898 B1 * | 3/2003 | Yuval | ............................ | 708/204 |
| 6,581,063 B1 * | 6/2003 | Kirkman | ............... | 707/E17.011 |
| 6,609,214 B1 * | 8/2003 | Dahlen et al. | ................. | 714/5.11 |
| 6,799,236 B1 * | 9/2004 | Dice et al. | ..................... | 710/200 |
| 6,807,619 B1 * | 10/2004 | Ezra et al. | ...................... | 711/219 |
| 7,016,923 B2 * | 3/2006 | Garthwaite et al. | .......... | 718/100 |
| 7,216,138 B2 * | 5/2007 | Abdallah et al. | .............. | 708/204 |
| 7,287,131 B1 * | 10/2007 | Martin et al. | .................. | 711/154 |
| 7,437,521 B1 * | 10/2008 | Scott et al. | ..................... | 711/151 |
| 7,509,448 B2 * | 3/2009 | Fachan et al. | ................. | 710/200 |
| 7,685,213 B2 * | 3/2010 | Reynolds | ...................... | 708/204 |
| 8,312,013 B1 * | 11/2012 | Smith et al. | .................... | 707/726 |
| 2004/0088702 A1 * | 5/2004 | Garthwaite et al. | .......... | 718/100 |
| 2006/0017974 A1 * | 1/2006 | Shapovalov | ................. | 358/1.17 |
| 2007/0174577 A1 * | 7/2007 | Moir et al. | ..................... | 711/170 |
| 2007/0203965 A1 * | 8/2007 | Reynolds | ...................... | 708/200 |
| 2007/0220076 A1 * | 9/2007 | Hinds | ........................... | 708/204 |
| 2008/0183958 A1 * | 7/2008 | Cheriton | ....................... | 711/108 |
| 2009/0292705 A1 * | 11/2009 | McKenney et al. | ............... | 707/8 |
| 2010/0235587 A1 * | 9/2010 | Noel | ............................ | 711/147 |
| 2011/0066885 A1 * | 3/2011 | Reynolds | ........................ | 714/16 |
| 2011/0219209 A1 * | 9/2011 | Reynolds | ........................ | 712/16 |

OTHER PUBLICATIONS

David C. Cann and Paraskevas Evripidou—"Advanced array optimizations for high performance functional languages"—Browse Journals & Magazines > Parallel and Distributed System IEEE Transactions on Date of Publication, Mar. 1995—vol. 6, Issue: 3—pp. 229-239.*

Youcef Saad and Harry A.G. Wijshoff—"SPARK: a benchmark package for sparse computations"—Proceeding ICS '90 Proceedings of the 4th international conference on Supercomputing—vol. 18 Issue 3b, Sep. 1990—pp. 239-253.*

* cited by examiner

*Primary Examiner* — Anh Ly

(74) *Attorney, Agent, or Firm* — Kilpatrick Townsend & Stockton LLP

(57) ABSTRACT

Embodiments of the present invention provide techniques, including systems, methods, and computer readable medium, for dynamic atomic bitsets. A dynamic atomic bitset is a data structure that provides a bitset that can grow or shrink in size as required. The dynamic atomic bitset is non-blocking, wait-free, and thread-safe.

12 Claims, 17 Drawing Sheets

DYNAMIC ATOMIC BITSETS

CROSS-REFERENCES TO RELATED APPLICATIONS

The present application is related to U.S. patent application Ser. No. 12/558,340, entitled "Dynamic Atomic Arrays," filed Sep. 11, 2009, the entire disclosure of which is incorporated herein by reference for all purposes.

BACKGROUND OF THE INVENTION

Embodiments of the present invention relate to software arrays, and more specifically to dynamic atomic arrays that are non-blocking, wait-free, resizable, and thread-safe.

Dynamic arrays are very useful data structures that are used extensively in software. A dynamic array is an array that can be resized and allows for elements of the array to be added or removed. The elements of the array can be of any available data type. For example, most modern programming languages that follow object oriented methodologies provide for dynamic arrays whose elements can be integers or floating point numbers. In addition, dynamic reference arrays are available wherein the array elements are not of a primitive data type, but rather the elements themselves are more complex types as can be represented by an object instantiated from a class definition.

Dynamic arrays can grow or shrink in size as needed by the software program that is utilizing the dynamic array. In many cases, the number of array elements that will be needed is not known in advance. The dynamic array allows the software developer to grow or shrink the size of the array as required, thus providing for more efficient use of system resources, such as memory. As array elements are added or removed, memory can be allocated or released, thus ensuring that the dynamic array is only using the amount of memory that is optimal for the current size of the array.

As computing hardware and software have evolved, the use of multi-threaded programs running on multi-core processors has become more commonplace. Standard computers for home use today typically contain between 2 to 4 processing cores. More advanced machines may contain multiple processors, each of which containing multiple cores. Software has been evolving to take advantage of the multi-processor hardware. For example, most modern programming languages support multi-threaded programs, which allow for a single processor to execute two or more tasks, or threads, of a single process in what appears to be concurrent operation. With the widespread availability of multi-cored processors, threads may not only appear to execute concurrently, but are in fact executing concurrently, each thread executing within a different core of the processor.

A standard dynamic array is ill suited to operation within a multi-threaded process. In common parlance, the dynamic array may be said to be thread unsafe. For example, it is possible that one thread may be attempting to expand the size of the array, while at the same time a second thread is attempting to decrease the size of the array. Such conflicts can easily lead to corruption of the dynamic array structure, and must be avoided. The avoidance of such conflicts is sometimes achieved by the use of read/write locks on the dynamic array. A thread wishing to access the dynamic array may acquire a lock on the array while the thread operates on the array. Other threads that wish to access the array must wait, or block, until the locking thread has released the lock.

Such a solution is not optimal for a number of reasons. One reason is that there is processing overhead required for a thread to acquire a lock on a dynamic array, and then release the lock once processing is complete. Although each individual lock and unlock operation is individually inconsequential, when aggregated over multiple threads, and for each and every access of the dynamic array, the locking and unlocking overhead can become significant. Furthermore, the use of locks for concurrent access to dynamic arrays is problematic because once a thread has locked the dynamic array, all other threads are blocked from accessing that dynamic array until the lock is released. It is possible that a higher priority thread may be blocked because it is waiting for access to the dynamic array, but the dynamic array is currently locked by a lower priority thread. Such a situation is referred to as priority inversion and is not desired.

Many modern programming languages provide for thread-safe versions of non-dynamic arrays. For example, the Java™ programming language provides atomic arrays for a variety of data types, including integers, longs, floats, doubles, and reference arrays. In concurrent programming, such as multi-threaded programming, an atomic operation refers to a set of operations that can be combined so that they appear to the rest of the system to be a single operation with only two possible outcomes: success or failure. Any changes made by an atomic operation will not be visible to the remainder of the system until all of the operations of the set of operations completes. In addition, if any of the operations within the set of operations fails, the entire atomic operation fails, and the system reverts to the state it was in prior to the start of the atomic operation. An atomic array allows for multiple threads to concurrently access the atomic array, without requiring the use of locks. For example, if one thread is altering the value of an array element, such a change will not be visible to other threads until the operation has completed. However, atomic arrays are not dynamic, meaning that the array cannot grow or shrink as required by the process using the atomic array. The techniques used for implementing dynamic arrays are generally not applicable to atomic arrays, because those techniques are not thread-safe and are generally wasteful of computing resources.

Embodiments of the present invention provide for thread-safe, non-blocking, wait-free dynamic atomic arrays.

BRIEF SUMMARY OF THE INVENTION

Embodiments of the present invention provide techniques, including systems, methods, and computer readable medium, for dynamic atomic bitsets. A dynamic atomic bitset is a data structure that provides a bitset that can grow or shrink in size as required. The dynamic atomic bitset is non-blocking, wait-free, and thread-safe.

In one embodiment, a tangible computer readable storage medium storing a set of instructions is provided. The instructions, when executed by a processor may cause the processor to create a dynamic atomic bitset object. In one aspect, the dynamic atomic bitset object comprises an array object that includes a pointer to a previous array object. The array object may also include an atomic integer array object, wherein a number of bits in the dynamic bitset object is dynamically changeable and the dynamic bitset object is concurrently accessible by multiple threads without requiring the use of locks.

In one aspect, the tangible computer readable storage medium further comprises instructions for resizing the dynamic bitset object. The instructions may cause the processor to create a new array object. A pointer to the array object may be stored as the previous pointer of the new array object. The array object may be replaced by the new array object using a compare and swap operation. In an embodiment, failure of the compare and swap operation will cause the steps of storing and replacing to be repeated.

In one aspect, replacing the array object with the new array object comprises copying each required element of the array object to the new array object using the compare and swap operation. A copied indicator bit may be set in each element of the array object using the compare and swap operation. In one embodiment, a failure of the compare and swap operation may cause the steps of copying and setting a copied indicator bit to be repeated. In one aspect, the new array object may be larger than the array object. In another aspect, the new array object may be smaller than the array object. In an embodiment, once each required element of the array object has been copied to the new array object, a snapshot pointer is set to point to the array object.

In another embodiment systems and methods are disclosed. The foregoing, together with other features and embodiments will become more apparent when referring to the following specification, claims, and accompanying drawings.

DETAILED DESCRIPTION OF THE INVENTION

In the following description, for the purposes of explanation, specific details are set forth in order to provide a thorough understanding of embodiments of the invention. However, it will be apparent that the invention may be practiced without these specific details.

Embodiments of the present invention provide for dynamic atomic arrays. A dynamic atomic array is a data structure that provides an array that can grow or shrink in size as required. A dynamic atomic array is non-blocking, wait-free, and thread-safe. A dynamic atomic array provides arrays of any primitive data type as well as complex types, such as objects.

Figure 1:
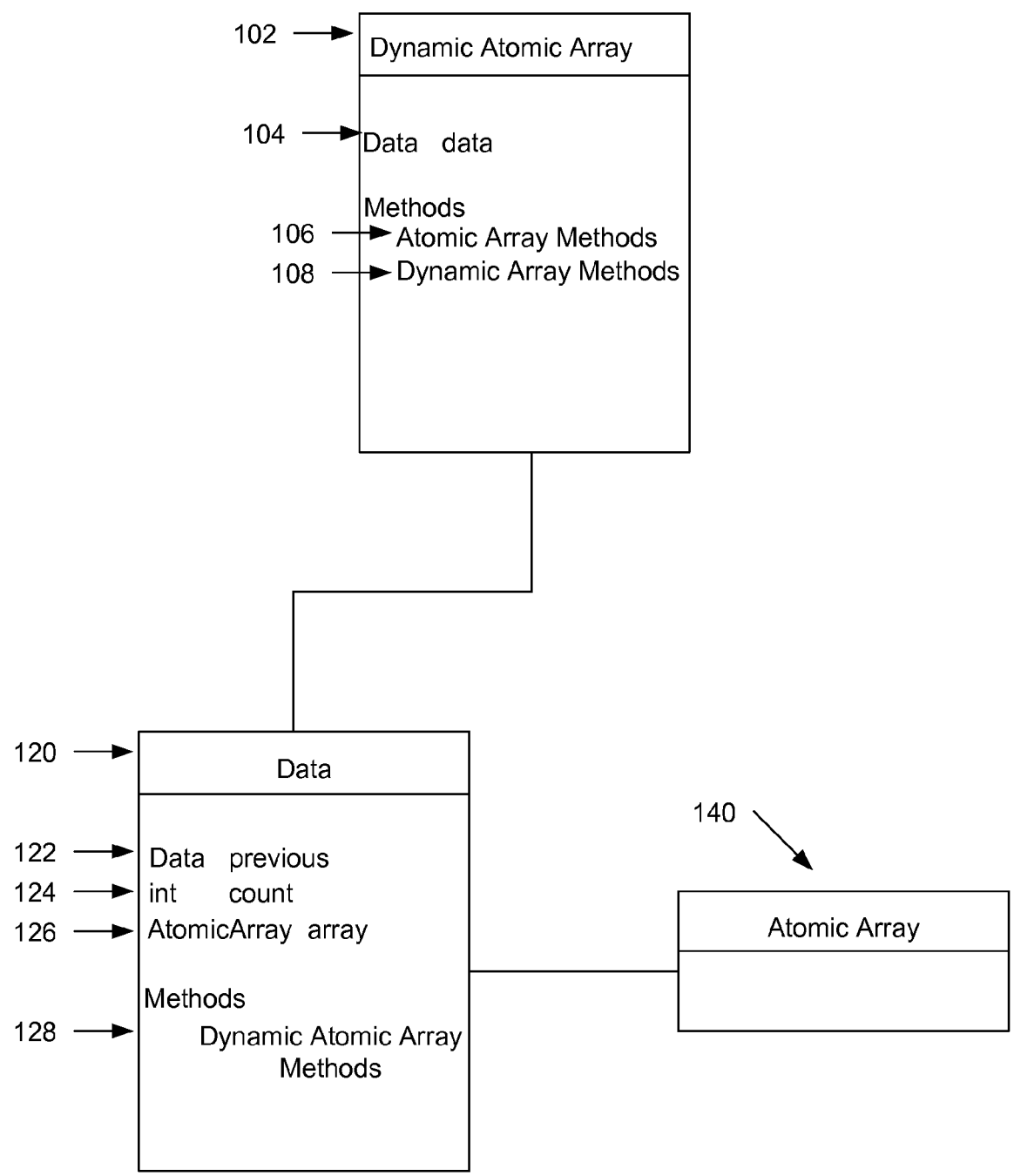
FIG. 1 depicts a simplified class diagram of a dynamic atomic array.

FIG. 1 depicts a simplified class diagram of a dynamic atomic array. Although FIG. 1 is presented in terms of a class diagram for an object oriented programming language, this is for purposes of simplicity of explanation. Embodiments of the present invention are applicable for use in any programming language including those that may not be object oriented.

The class diagram depicted in FIG. 1 is a simplified class definition for a dynamic atomic array. The remainder of this disclosure will refer generically to a dynamic atomic array which will signify an object instantiated by a program in accordance with the class definition of FIG. 1. Dynamic atomic arrays are provided for all data types, such as integers, floats, longs, or references (e.g. objects). A dynamic atomic array of integers may be referred to as a dynamic atomic integer array. A dynamic atomic array of floats may be referred to as a dynamic atomic float array. For ease of description, the particular data type of the dynamic atomic array will be omitted, but it should be understood that an atomic dynamic array is an array of elements of the same type.

In some embodiments, the class definition of a dynamic atomic array 102 comprises an attribute that will be referred to as Data 104. The structure of the Data 104 attribute will be described below. The dynamic atomic array 102 may also contain methods for operating on the dynamic atomic array. There are generally two categories of methods that are provided. The first are methods 106 that mirror those of the underlying atomic array 140. These methods will be described further below, but for now these methods are those that will be used to manipulate elements of the dynamic atomic array, and generally match the method signatures of the underlying atomic array 140. As explained above, most programming languages provide atomic arrays as part of standard class libraries. The second category are methods 108 which are for dynamically manipulating the array itself. For example, methods 108 are used to grow and shrink the dynamic atomic array. Both categories of methods 106 and 108 will be non-blocking, thread-safe, and wait-free.

The structure of the Data 104 attribute of the dynamic atomic array 102 is shown in Data class definition 120. Data class definition 120 may contain an attribute previous 122 that is of the same type as Data class definition 120. The previous attribute 122 may be used to store a pointer to another instance of the Data structure 120. The use of the previous 122 attribute will become clearer with respect to FIG. 2. Data structure 120 may also contain a count 124 attribute. The count 124 attribute may be used to determine the number of data elements remaining to be copied out of the attribute array 126. The use of the count 124 attribute will be explained further with respect to FIG. 2. The count 124 attribute may be excluded from some embodiments.

Data class definition 120 may contain an attribute array 126. Attribute array 126 may be an atomic array 140. As mentioned above, most modern programming languages have provided atomic array classes for various types, such as integers, longs, floats, doubles and references. Rather than recreate the functionality provided by these classes, embodiments of the dynamic atomic array will reuse the atomic array classes to provide the atomic array functions that are already known. Those functions can include creating, reading from, and writing to atomic arrays. As mentioned above, atomic array methods 106 are provided that will match the method signatures of the methods of atomic array 140. These methods 106 will allow for thread-safe, non-blocking, wait-free access to the elements of the array 126, usually by simply calling the methods of the underlying atomic array 140. For example, atomic array 140 may contain a method get(int i) which will return the element at position i of the atomic array. A method 106 will be provided that matches the signature of the get method of the atomic array. The method 106 may follow the form get(int i) {data.array.get(i)}. When a call to the get method 106 is made, the method will call the get method of the atomic array 140. Similar methods 106 may be provided for each method of the underlying atomic array 140.

By matching the method signatures of methods provided by the underlying atomic array 140, a dynamic atomic array can advantageously be used as a drop-in replacement for an atomic array. No additional code changes to the program that was using a standard atomic array are required. The program can simply access the dynamic atomic array in the same manner as it previously accessed the atomic array. However, the dynamic atomic array will allow for changes in size of the array.

The atomic array 140 as provided by most programming languages is not dynamic, meaning that the array cannot grow or shrink. In order to resize the array, dynamic atomic array methods 128 are provided. Methods 128 will perform functions such as growing or shrinking the dynamic atomic array in a manner that is non-blocking, wait-free, and thread-safe.

As would be clear to a person of skill in the art, the class definition as described in FIG. 1 may be used by a computer program to create an instance of a dynamic atomic array. For purposes of simplicity of explanation for the remainder of this disclosure, some terms and their usage will be set forth. References to an array will generally refer to an object that is instantiated from the class definition of a dynamic atomic array as depicted in FIG. 1. Furthermore, although reference to the particular type of the data elements that are being stored in the array has been omitted, it should be understood that an array will contain data elements of a given type. For example, an array of integers, an array of longs, an array of floats, an array of doubles, an array of references (e.g. objects), etc.

References to an array will generically be used to denote an instance of a dynamic atomic array. For example, reference to an array will include the dynamic atomic array 102 class definition and will include the underlying atomic array 140 that stores the values for the elements of the array. Furthermore, although array elements will be described as having values, this is for ease of description only. An array element may store a single value or a reference to an object. The term value will be used to identify and compare array elements, but does not imply that the elements themselves are an individual value of a primitive data type.

The term "current array" or "current" will be used throughout the remainder of the disclosure. These terms describe the computer program's view of the particular Data 120 object that is being pointed to by the data 104 attribute of a dynamic atomic array. For example, a variable X can be defined as being of type dynamic atomic array. A new dynamic atomic array object may be created and assigned to variable X. Part of the new dynamic atomic array object will be a data attribute 104 that will point to a data object that is instantiated according to the class definition Data 120. The data object pointed to by the data attribute 104 can be referred to as "current" and will have a memory location associated with it. A second data object can be instantiated according to the data class definition 120. The data attribute 104 of the dynamic atomic array can be replaced with the second data object. At this point "current" will be the second new object. In other words, "current" will always indicate the specific data object that is currently associated with the data attribute 104 of a dynamic atomic array.

FIG. 2(a-f) depicts a dynamic atomic array that is being resized to be larger than its present size. In other words the array is being expanded so that more elements can be stored. As shown in FIG. 2(a), a multi-threaded computer program may have a dynamic atomic array object. The dynamic atomic array object may contain a data object 202 that has been instantiated from a class definition 120, such as the one depicted in FIG. 1. The purpose of the program itself is only relevant to the extent that the program utilizes a dynamic atomic array. The data object 202 may initially be assigned to the data 104 variable. Although the program may instantiate any number of dynamic atomic arrays, for ease of description only a single dynamic atomic array will be described. The data object 202 may be accessible by all threads within the computer program through the data 104 variable, and may be considered a resource that is shared among all threads. The data object 202 that is initially instantiated by the program will contain an atomic array as depicted in FIG. 1. For ease of description, the data object will be referred to as the current 201 array or current. Current 201 will always point to the specific object in memory that is currently associated with the variable data 104. However, as will be seen as the example continues, the specific object in memory that is the current 201 object can change. Furthermore, as shown in FIG. 1, the Data object class definition 120 includes three attributes: previous, array, and count. For ease of description, a data object instantiated from class definition 120 will simply be referred to as an array. It should be clear that the array contains an atomic array, which is used to store the actual data values, a previous pointer, which points to another object of type array, and in some embodiments, a count value.

The array 202 may contain a pointer 204 to a previous array, a count 206 indicating the number of elements that need to be copied out of the array, and an array of elements 208. As explained above, the array elements are all of a single type, but that type can be any type supported by the system. In the array 202 depicted in FIG. 2(a), there is currently no previous array defined and so pointer 204 is set to NULL, the count 206 indicates that there are four elements in the array of elements 208, and the array of elements 208 is currently holding four values, which in this example are integers.

At some point of the program's execution, one of the program threads may determine that it is necessary to grow the size of the array. The exact reason why an array needs to grow is relatively unimportant. Embodiments of the present invention advantageously allow for an array to be dynamic, which is to say the array can grow or shrink as desired by users of the array. The decision as to when to grow or shrink the array is left up to the logic of the computer program that is utilizing the dynamic atomic array, and embodiments of the present invention advantageously provide methods for non-blocking, wait-free, thread-safe, growth and shrinkage of the array. One typical reason for growth of the array may be a thread wishes to write to an element that is currently beyond the size of the current array.

In order to grow the array, the thread that wishes to grow the array will create a new array 222. The new array will be created by the thread calling the dynamic array methods 108 that were described above. A more detailed description of the process will be presented with respect to FIG. 3(a). The new array will typically be of a size that is specified by the thread that is wishing to grow the array. In one embodiment, new array 222 may be created by instantiating a second object from the class definition of Data 120 object of FIG. 1. New array 222 can have a count 226 that reflects the desired size of the array. New array 222 can also have an array of elements 228 which contains the number of elements that were specified when the new array was created. The new array 222 can also have its previous pointer 224 set to point to what is presently the current array. In this example, the previous pointer 224 points to the current array 202, the array of elements 228 is sized for storage of up to six elements, and the count 226 is set to six, indicating that the new array 222 has six elements.

In some embodiments, the array of elements 228 may initially have NULL values populated for each element. In alternate embodiments, the value may be something other than NULL. A further description of the alternate embodiments will be presented with respect to FIG. 8. Once the new array 222 has been created, and the previous pointer 224 of the new array 222 has been set to point to the previous array 202, the thread that is attempting to enlarge the array will atomically update current 201, which is the same as the data 104 attribute of the dynamic atomic array, so that it will point to the new array 222.

In a single-threaded program, changing the specific object in memory referred to by a variable is not a problem, because there is only one thread, which is fully aware of the actions being taken. In a multi-threaded program, each thread operates relatively independent of the other threads. If two threads attempt to simultaneously change the specific object in memory pointed to by a variable, the system could be left in an invalid state. For example, if two threads created a new array, and both attempted to update current, the results would be unpredictable. Current can only contain one value, so at least one thread's update would be discarded. There would be no way to predict which thread's update would be successful. The problem is overcome through the use of a Compare and Swap (CAS) operation. As will be explained in further detail below, the use of the CAS operation ensures that only one thread will be successful in updating current.

A CAS operation is a special CPU instruction or set of instructions that atomically compares the contents of a specified memory location to a first value and, if they are the same, modifies the contents of that specified memory location to a new value. A CAS operation is atomic because it cannot be divided. Thus, a thread executing a CAS operation is assured that once the instruction begins execution, no other thread will be allowed to modify the specified memory location prior to completion of the CAS operation. A CAS operation will typically take three parameters: (1) the memory location; (2) the comparison value; and (3) the value to be stored. If memory location (1) is storing a value that is equal to comparison value (2), then value (3) will be swapped into memory location (1), and success will be returned. Otherwise, the return will indicate a failure.

The thread that is expanding the array 202 may use a CAS operation to store the new array 222 as the current array 201. The CAS operation may receive as its inputs (1) the memory location of the current array 201 which is the same as the data 104 attribute of the dynamic atomic array, (2) the memory location of the array 202, and (3) the memory location of the new array 222. The CAS operation compares the memory location of the current array 201 to the memory location of the array 202. If the memory locations are the same, this means that no other thread has changed the memory location of the current array 201. The CAS operation will then store the memory location of new array 222 as the current array 201. In other words, the data attribute 104 that was pointing to the memory location of array 202 is swapped to now point to the memory location of the new array 222. It should be noted that the array object 202 that previously was pointed to by current array 201 can now be referenced using the previous pointer of new array 222 that is now pointed to by current pointer 201.

Although this example has been presented with respect to the CAS operation, embodiments of the invention are not so limited. Any other operation that can suitably determine that no other thread has altered the current 201 pointer and store the value of the new array 222 as current 201 has also been contemplated. This applies not only to altering the value of current, but also to any other operations described in the present disclosure that utilize a CAS operation.

In the event that the CAS operation fails, which means that current 201 is not equal to the array 204 because some other thread has altered the value of current 201, the process will attempt the operation again. The latest current 201 will be retrieved, the previous 224 will be updated, and the CAS operation will be attempted again.

The array pointed to by current 201 is treated as the current array. When current 201 points to array object 202, then array object 202 is considered as the current array. When current 201 points to array object 222, array object 222 is considered the current array. The previous pointer 224 will point to array 202, which is now the previous array. The process of copying the previous array elements 208 to the new array elements 228 will be described in the remainder of FIG. 2.

At this point in the example, a new larger array object 222 has been created, however the values of the array elements 228 do not reflect the values of the array elements 208 of what is now the previous array 202. The values from elements 208 of the previous array 202 need to be copied to elements 228 of what is now the current array 222. The process of copying elements from the previous array to what is now the current array needs to be performed whenever an array is being resized to be either larger or smaller than its current size.

In a single-threaded environment, such a copy process would be straightforward. The elements would simply be copied, one after another. The process becomes more difficult in a multi-threaded environment, because as the thread that resized the array is copying elements, another thread may be attempting to read or write an element. A thread that is reading an element would read the element from what is the current array, however if that value has not yet been copied from the previous array, the value may not be accurate. A simple solution would be to use a lock on the array until the copy is complete, however this would result in the reading thread being blocked while the copy completes. A similar situation arises when a thread writes a value to the current array. If the array element has not yet been copied, the value that was written may be overwritten when the element is copied from the previous array. Embodiments of the present invention advantageously allow for all threads to continue normal operation without requiring a lock on the array.

Before presenting a detailed description of the copying process, a brief overview may be helpful in understanding the process. For purposes of simplicity, the overview will be presented with respect to two threads, however it should be understood that this simplification is only for the purposes of explanation, and is not intended to be limiting. The overview will refer to a first thread that caused the array to be resized, as the resizing thread. The second thread, which is just attempting to access an element of the array will be referred to as the accessing thread. The explanation will begin at the point where the new array 222 has been created, its previous pointer set to the previous array 202, and the new array 222 is the current array 201. However, no elements from the previous array 202 have been copied to the array 222.

As mentioned briefly above, in a single-threaded process, the resizing thread would simply copy the array elements, one at a time, from the previous array to the current array. As there would be no other threads to interfere with the process, the copy operation is straightforward. The situation becomes more complex when multiple threads may interfere with each other. In one embodiment, the resizing thread is responsible for ensuring that every element from the previous array is copied to the current array, either by the resizing thread or the accessing thread. The resizing thread may begin copying each element a single element at a time. Once an individual element has been copied, the value of the element in the previous array may be changed to a COPIED value that indicates the element has already been copied.

The COPIED indicator is simply a value that is defined by a dynamic atomic array to indicate that an element has already been copied. In the case of a reference array, which is an array whose elements are objects, the COPIED indicator can simply be a dummy object. As the COPIED object will be unique, there will be no possibility that a particular array element may by pure chance be equal to the COPIED object. The presence of the COPIED object will definitively mean the array element has already been copied.

The COPIED indicator is slightly more complex in cases wherein it is not possible to pick a value to be the COPIED indicator that is unique. For example, in an array of integers, an element can contain the value of any integer. It would not be possible to define a specific value as the COPIED indicator, because that value may by pure chance also be used by the program as a valid value for other reasons. In order to overcome this problem, each array when created will choose a value that is likely not to occur in the normal course of operation of the program. For example, for an array of integers, an extremely large and negative value may be chosen. Although this reduces the likelihood of confusion between the COPIED indicator and an actual valid value, it still does not eliminate a potential conflict. The solution rests in initializing the values of all elements of a newly created array to the value chosen as the COPIED indicator for the previous array. By doing so, even though it cannot be determined if a value in the previous array is the COPIED indicator, or just so happens to equal the COPIED indicator, it does not matter. The value in the current array has already been initialized such that a copy would not be necessary. For the remainder of the disclosure, a comparison to the COPIED indicator will mean that the value has already been copied to the current array. In some cases, this is determined by a simple comparison to the COPIED indicator. In other cases, the COPIED indication will rely on the initialization of the current array to the COPIED indicator of the previous array. This operation is explained in further detail with respect to FIG. 8.

The resizing thread may read a value of an element from the previous array, write that value to the same element of the current array, and then store the COPIED indicator in the element of the previous array. However, it is possible that at some point in this process of copying a single element, the resizing thread is suspended, and the accessing thread is allowed to run. The accessing thread may attempt to access an element in the current array. The accessing thread may check to see if there is a previous array. If so, this indicates that there is a resizing in progress, and the array element in the current array cannot be relied upon, as the element may not yet have been copied from the previous array.

Rather than blocking the accessing thread from accessing the element until the resizing thread has copied the element, embodiments of the invention advantageously allow the accessing thread itself to copy the element to the current array, if required. The accessing thread may examine the element being accessed in the previous array. If the element is the COPIED indicator, the accessing thread knows that the element in the current array has already been copied, and can be relied upon as accurate. If the element is not the COPIED indicator, the accessing thread will itself copy the element from the previous array to the current array. This not only reduces the amount of copying that needs to be done by the resizing thread, but also allows the accessing thread to continue to make progress. Because the accessing thread itself either copied the element from the previous array to the current array or verified that the element has already been copied, the accessing thread is ensured that it has the correct value for the element in the current array.

If the accessing thread copies an element from the previous array to the current array, the accessing thread may store the COPIED indicator in the element of the previous array, to indicate that the element has already been copied. At some point, the accessing thread may be suspended, and the resizing thread allowed to run. As the resizing thread continues to copy elements from the previous array to the current array, if an element is encountered in the previous array that is the COPIED indicator, the resizing thread knows that the element has already been copied, and may simply move to the next element.

Although the previous high-level description generally describes the process of copying elements from the previous array to the current array, a more detailed description of the process is needed. Because of the nature of multi-threaded processes, wherein any thread may be suspended at any time, and a different thread allowed to run, additional safeguards are necessary. For example, the accessing thread may read an element from the previous array that is not the COPIED indicator, and then be suspended immediately after the read. The resizing thread may then run and copy the element from the previous array to the current array. When the accessing thread is allowed to run again, its last state would indicate that the element has not yet been copied, and should be. However, the resizing thread has already copied the element. These additional safeguards are provided through the use of the CAS function, and will be described in further detail below.

Figure 2A:
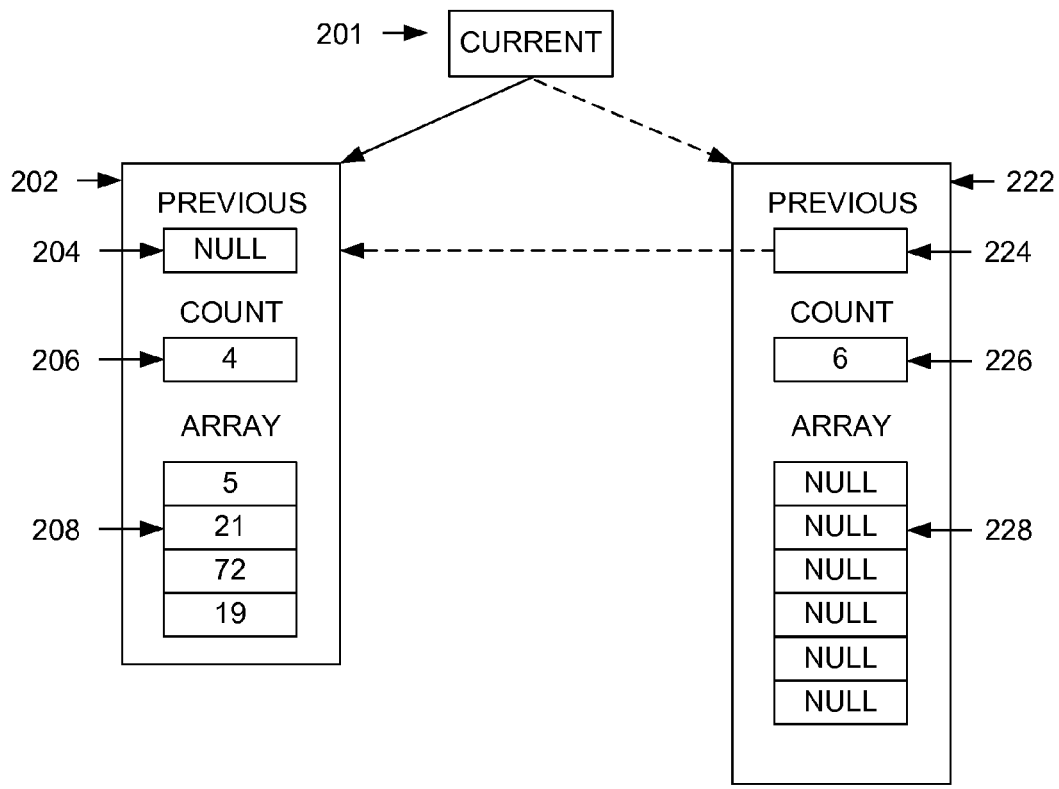
FIG. 2(a-f) depicts a dynamic atomic array that is being resized larger.
Figure 2B:
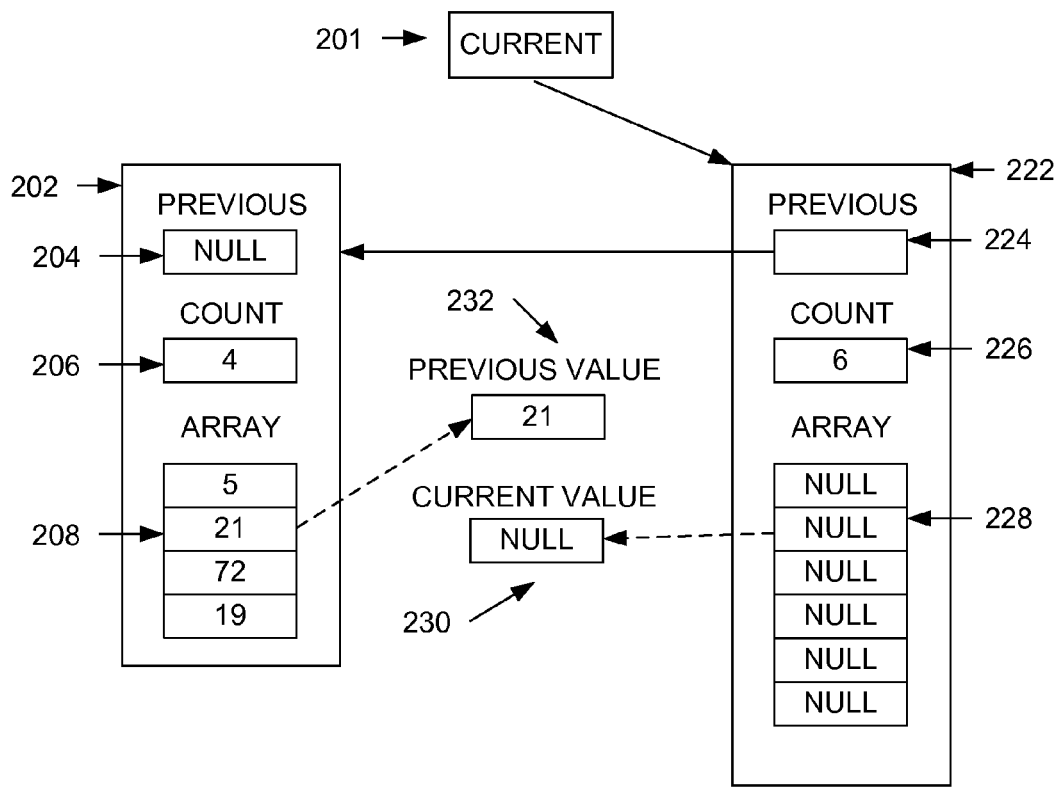

FIG. 2(b) depicts a thread that is attempting to read an array element immediately after the array has been resized to a larger size. A more detailed description of the process is presented below with respect to FIG. 6. For purposes of description, FIG. 2(b) depicts a second thread that is different than the thread that enlarged the array accessing the second element of the array of elements 228 of the current array 201. The value of the second element 228 of the current array 222 is retrieved and stored in current value 230. The value of the second element 208 of the previous 224 array is also retrieved and stored in previous value 232. If previous value 232 is equal to a COPIED indicator, this means that the second array element 208 of the previous array 202 has already been copied to the current array 222, and the current value 230 is the correct value, and can be utilized by the second thread.

Figure 2C:
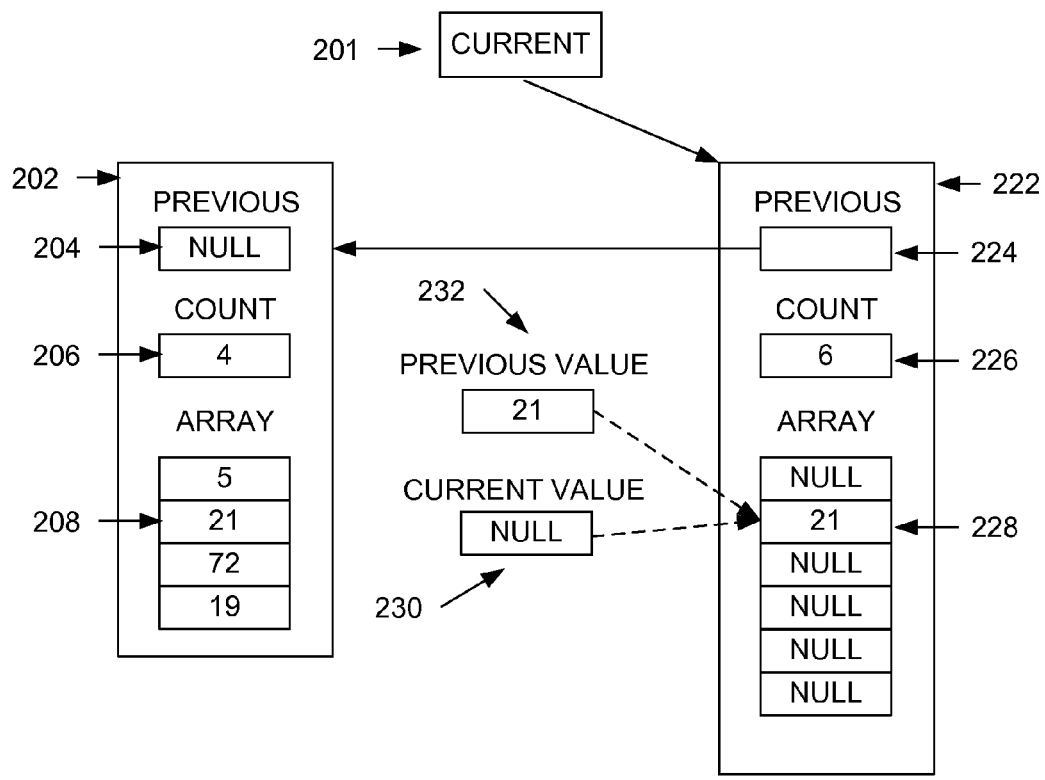
Figure 2D:
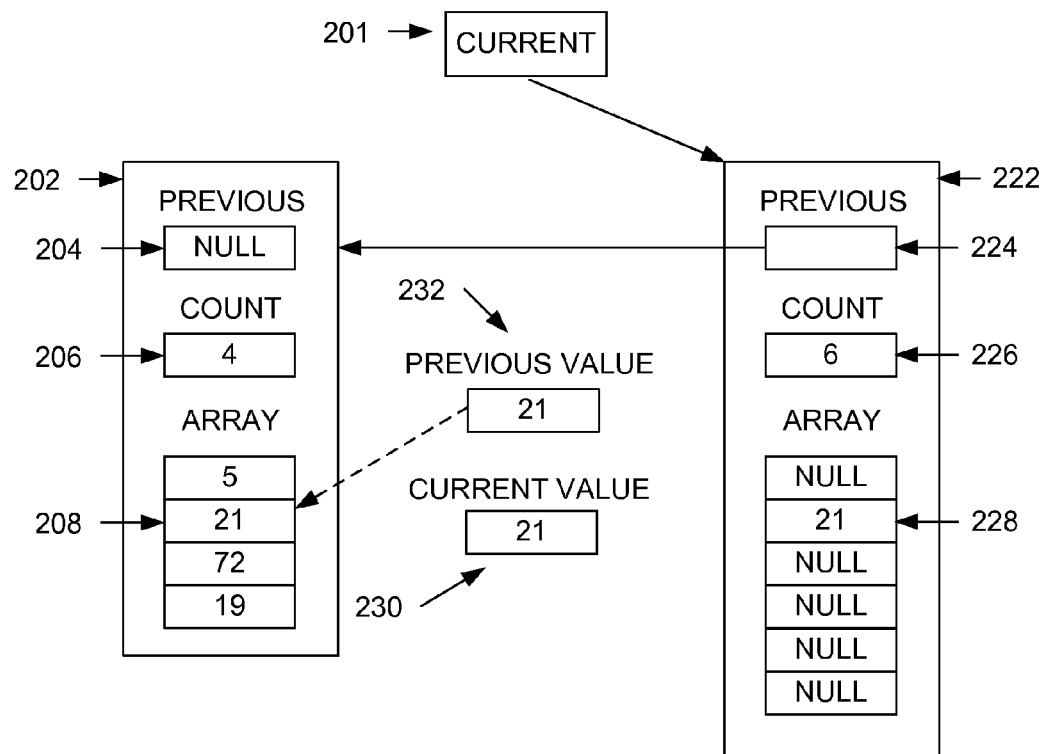
Figure 2E:
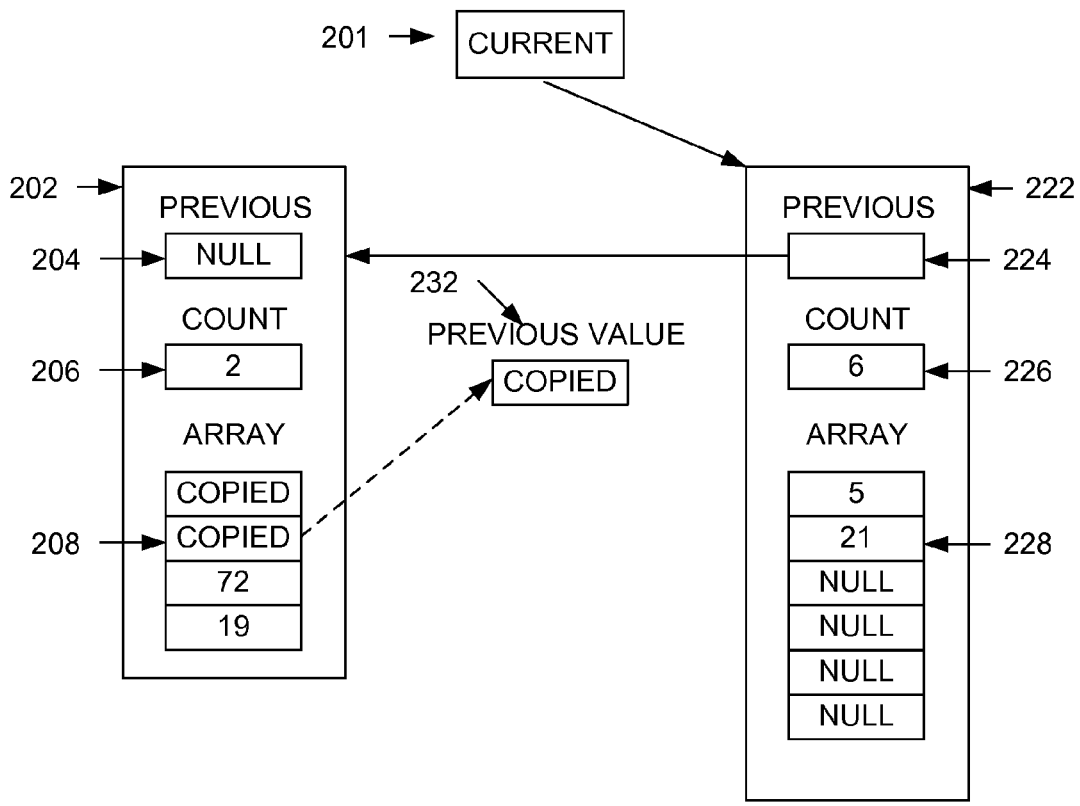
Figure 2F:
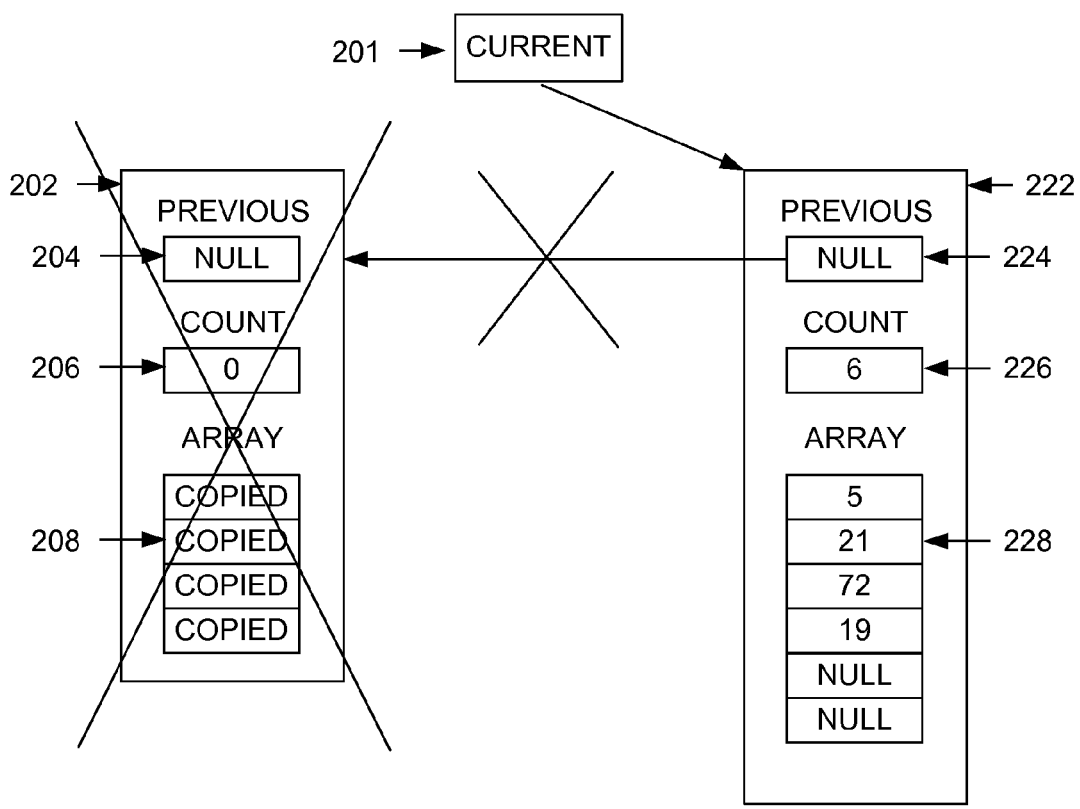

If the previous value 232 is not the COPIED indicator, this means that the current array 222 does not have the most up-to-date value for the second array element. FIG. 2(c) depicts a CAS operation being used to copy the previous value 232 to the second element 228 in the current array 222 pointed to by current 201. The CAS operation compares the value stored in the second element 228 of the current array 222 with the current value 230. If they are the same, then the previous value 232 will be stored in the current array 222. A successful CAS operation means that no other thread has changed the value that was stored in the second element 228 of the current array 222 between the time the current value 230 was retrieved and the CAS operation was executed. If the CAS operation fails, this means that another thread has modified the value of the second element of the array of elements 228 and the correct value for that element should be treated as unknown. The copy process must be attempted again to ensure the current array has the correct value. This process will be described in further detail with respect to FIG. 6.

FIG. 2(*d*) depicts the current array 222 after the second element 228 has been successfully copied from the previous array 202. It is now necessary to indicate within the previous array 202 that the second element 208 has already been copied. This is accomplished by using a CAS operation to store a COPIED indicator in the second element 208 of the previous array 202. The CAS operation will compare the previous value 232 with the value that is currently stored in the second element 208 of the previous array 202. If they are the same, the CAS operation will store a COPIED indicator in the second element 208 of the previous array 202. If the CAS operation is successful, this means that no other thread has modified the value of the second element 208 of the previous array 202 between the time when the previous value 232 was retrieved and the time of execution of the CAS operation. If the CAS operation fails, this means that another thread has modified the value of the second element of the array of elements 208 and the copy process must be attempted again because it can not be ensured that the current array has the correct value. This process will be described in further detail with respect to FIG. 6.

FIG. 2(*e*) depicts the current array at a point after the second thread has copied the second array element from the previous array 202 to the current array 222 and the enlarging thread has copied the first element to the current array 222. In some embodiments the process explained with reference to FIG. 2(*b-d*) could be relied on to copy all elements from the previous array 202 to the current array 222. As threads access elements of the current array 222, those elements would be copied from the previous array 202. Assuming every element of the current array 222 is accessed, eventually all of the elements of the previous array 202 would be copied to the current array 222. However, the copy would not be complete until each element of the current array 222 was accessed, and if there was an element that was never accessed, the copy would never complete.

In order to ensure the copying process completes, the thread that initially enlarged the array may loop through every element of the array using the same process that was described with reference to FIG. 2(*b-d*). FIG. 2(*e*) depicts a situation wherein the thread that enlarged the array has completed the copy of the first element, and is now attempting to copy the second element 208. However, the second thread has already copied the second element, so when the enlarging thread reads the value stored in the previous array 232, it will equal the COPIED indicator. As such, the enlarging thread does not need to copy the second element, and can proceed to the next element.

It should also be noted that upon each successful copy of an element from the previous array 202 to the current array 222, in some embodiments the count value 206 of the previous array may be decremented. FIG. 2(*f*) depicts the situation when all values of the previous array 202 have been copied to the current array 222, and the count value 206 of the previous array has reached zero. At this point, the previous pointer 224 of the array 222 that is current 201 can be cleared to NULL, because all the data stored in the previous array 202 has already been copied to the array 222. In some operating environments, the clearing of the previous pointer 224 may indicate to the runtime system that the previous array 202 is no longer required, and the memory used for the previous array 202 can be reclaimed.

In an alternative embodiment, accessing threads may only copy an element from the previous array to the current array if the accessing thread is trying to write to the element. In cases where the accessing thread is only trying to read the element, the accessing thread will not perform the copy. For example, if an accessing thread is trying to read an element, and the element is not the COPIED indicator, the accessing thread can simply read the value without copying the value to the current array. It will be left to the enlarging thread to copy the array element to the current array. If the value is the COPIED indicator, the accessing thread simply retrieves the value from the current array as described above.

In the case of an accessing thread that is trying to write to an array element, if the value is the COPIED indicator in the previous array, the accessing thread can use a CAS operation to write the element into the current array, as described above. If the element is not the COPIED indicator, the accessing thread can use CAS to write the element in the previous array. Again, it will be left to the enlarging thread to copy the array element to the current array.

As should be clear from the description presented with respect to FIG. 2, embodiments of the present invention advantageously allow for the dynamic growth of an atomic array. The growth is non-blocking as no locks on the dynamic atomic array are required. The growth is also wait-free, as all threads of a process are able to continue to make progress during the growth of the array. Furthermore, the dynamic atomic array advantageously maintains all of the benefits of an atomic array that is not dynamic, through the use of the atomic array for handling operations that are not related to growth of the array. Although FIG. 2 has been presented with respect to growth of the dynamic atomic array, the same principles apply to shrinkage of the dynamic atomic array. The process of dynamic atomic array shrinkage will be described in further detail with respect to FIG. 3(*b*).

FIG. 3(*a*) depicts a simplified block diagram of the process of growing a dynamic atomic array. The need to expand the array can arise for any number of reasons. For example, a process may wish to add an element at an array position that is beyond the end of the current array. Such a situation will be described in further detail with respect to FIG. 7. For purposes of explanation, FIG. 3(*a*) will be described with reference to the process for growing a dynamic atomic array, regardless of the reason the growth is required.

The process begins at step 305 with the creation of a array of a specified length, which will be referred to as Length L. The Length L indicates the number of elements of the array. In some embodiments, the length may be specified as a parameter to a method of the dynamic atomic array, the method causing the dynamic atomic array to grow to the length specified by the parameter. In some embodiments, when the array elements are not objects, the new array will have all array elements populated with the COPIED indictor of the previous array. This process will be explained in more detail with respect to FIG. 8. The Length L of the newly created array can also be stored in the count field of the newly created array. The use of the count field will be described in further detail with respect to FIG. 5. In some embodiments, the new array may not be created until after step 315, where it is determined if it is even necessary to create the new array. The process continues on to step 310, current array is retrieved. As explained above, current is the array object that is associated with the data 104 pointer of a dynamic atomic array object created within the program.

At step 315, the length of the current array is compared with the length L. If the current array is of a length that is greater than or equal to the length specified by Length L, there is no reason to expand the current array, as the current array is already sufficiently long enough. The process can then simply end, as there is nothing more to do. However, if the length of the current array is smaller than the specified Length L, the process continues on to step 320.

At step 320, the previous pointer of the newly created array can be set to point to what is now the current array object. As was briefly explained above with respect to FIG. 2, step 320 is in preparation of swapping the newly created data object with what is the current data object. At step 325, the CAS operation is used to swap the data pointer of the dynamic atomic array object to point to the newly created data object.

The CAS operation will receive a pointer to the data object that is current. The CAS operation will also receive the reference of the current data object that was retrieved in step 310, as well as the reference of the newly created data object in step 305. As explained above with respect to the CAS operation, if the data object and the reference pointed to by current are the same, this ensures that no other thread has changed the value of the current array between steps 310 and 325. The CAS operation may then set the value of the current array to point to the array object that was created in step 305. If the data object and the current array object retrieved in step 310 are not the same, another thread must have changed the current array, and CAS operation will fail.

At step 330 the result of the CAS operation is examined. If the result indicates a successful swap, the process proceeds to step 335, where the array elements from what is now the previous array are copied into what is now the current array. This process will be explained in further detail with respect to FIG. 4. Once the current array has been updated, the process may end. If the result of the CAS operation indicates that the swap was not successful, this indicates that another thread may have updated the current array at some point between steps 310 and 325. In any case, a failure indicates that the thread's view of what is the current array is incorrect. The process will then return to step 310, where the current array is retrieved again, and the process continues until either the current array is greater than or equal to the Length L, or the new array is successfully swapped with the current array.

Figure 3A:
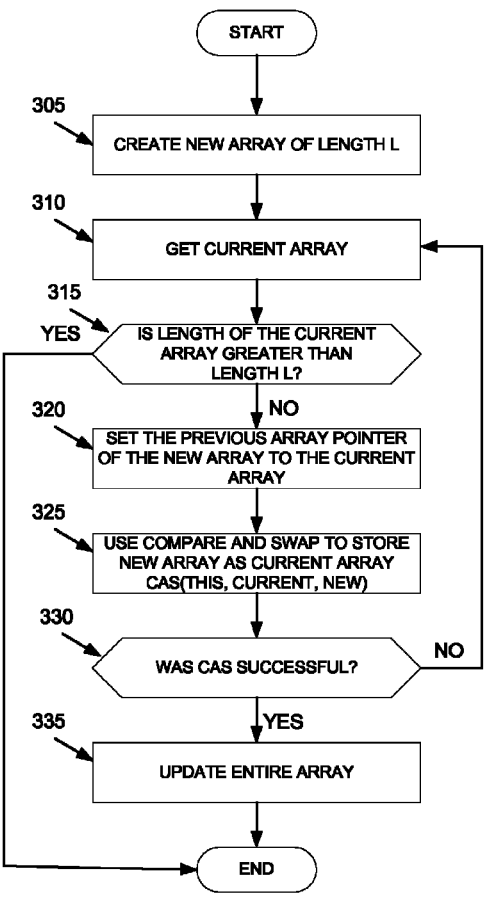
FIG. 3(a-b) depicts a simplified block diagram of the process of growing and shrinking a dynamic atomic array.
Figure 3B:

FIG. 3(b) depicts a simplified block diagram of the process of shrinking a dynamic atomic array. The need to shrink the array can arise for any number of reasons. For example, a thread may determine that the array will no longer require the last several elements, and thus can be reduced in size. For purposes of explanation, FIG. 3(b) will be described with reference to the process for shrinking a dynamic atomic array, regardless of the reason why the array is being reduced in size.

The process for shrinking the dynamic atomic array is almost identical to the process depicted in FIG. 3(a) for growing the dynamic atomic array, with the exception of step 315. Instead of executing step 315, which determines if the current array is larger than the specified Length L, step 315(b) determines if the length of the current array is already less than the specified Length L. If it is, there is no need to shrink the current array, and the process may end. If it is not, the same process of swapping the current array and the new array as explained in FIG. 3(a) is executed.

Figure 4:
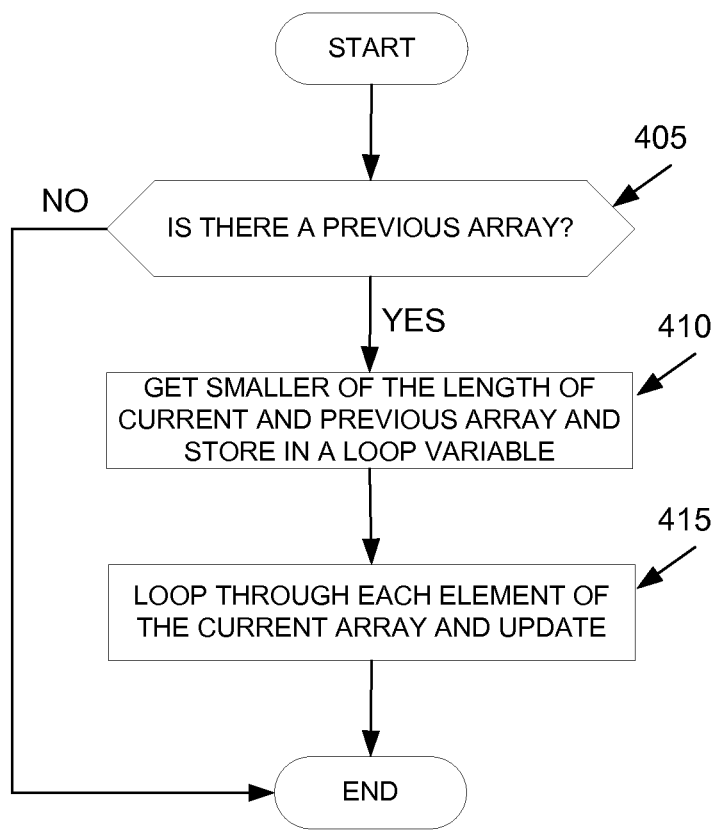
FIG. 4 depicts a simplified block diagram of the process of updating all the elements of a dynamic atomic array.

FIG. 4 depicts a simplified block diagram of the process of updating all the elements of a dynamic atomic array. The process begins at step 405 where the current array is examined to determine if there is a previous array defined. If there is no previous array, there is nothing that requires updating, and as such, the process may end. If there is a previous array defined, then the process proceeds on to step 410.

At step 410, the length of the current array and the previous array are retrieved. The values are then compared to determine which one is smaller. The reason for this is that in the case of array growth, the previous array will be smaller than the current array, and as such it will only be necessary to copy the elements of the previous array that exist to the current array. In the case of array shrinkage, the current array will be smaller than the previous array. Therefore it is only necessary to copy the values of the previous array that will still exist in the new array. The smaller of the two values can then be stored in a loop variable.

At step 415, using the loop variable, each element of the current array can be iterated, and an update process for each element can be invoked. The update process for an individual element will be described with reference to FIG. 5. Once each necessary element in the current array has been updated, the process may end.

Figure 5:
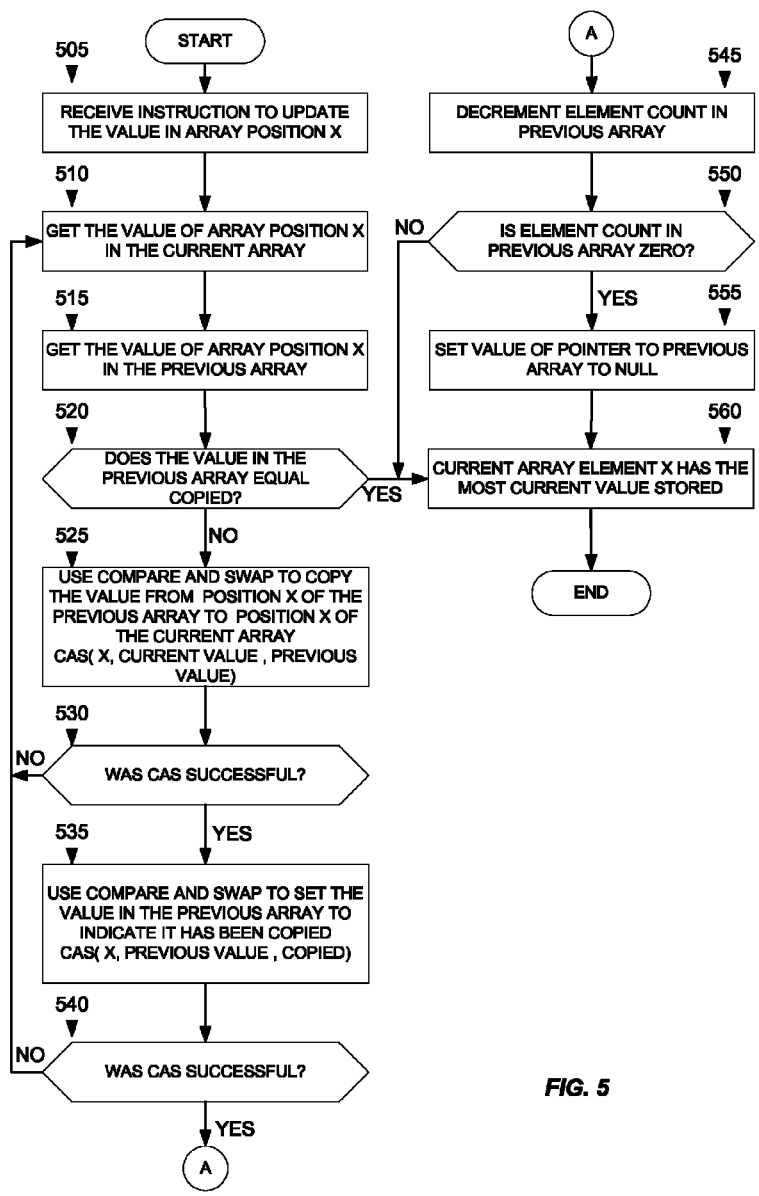
FIG. 5 depicts a simplified block diagram of the process of updating a single element of a dynamic atomic array.

FIG. 5 depicts a process for updating an individual element of the current array. The process depicted in FIG. 5 ensures that an element from the previous array is correctly copied into the current array, and that it is indicated as having been copied in the previous array. Furthermore, the process in FIG. 5 will determine if the array element that is being copied out of the previous array is the last element that requires copying, and if so, will clear out the previous array pointer. In some programming languages, this may be used to determine that the previous array is no longer required, and the memory occupied by the previous array can be reclaimed.

The process begins at step 505 where an instruction to update the value of array element X of the current array is received. The process continues on at step 510 by retrieving the value of array element X of the current array. The process then continues at step 515 by retrieving the value of array element X of the previous array. At step 520, the previous value retrieved in step 515 is compared with the COPIED indicator. If the previous value is equal to the COPIED indicator, it means that this array element does not need to be copied to the current array. This can arise in two situations. First, another thread has copied this array element while the resizing of the array was occurring. This situation will be explained further with respect to FIG. 6.

The second is that the value of the COPIED indicator by pure chance happens to be the same as the value that was stored in element X of the previous array. As was explained above, for reference arrays, that is an array whose elements are objects, a unique object can be defined as the COPIED indicator and hence there is no opportunity for the COPIED indicator to be the same as a value stored in the previous array. However, for other data types, such as an integer, there is always the possibility that the actual value and the COPIED indicator are the same. However, this situation is mitigated as explained above, by initializing the current array, when created, to have all elements contain the value that is the COPIED indicator of the previous array. By doing so, even if the value stored in the previous array coincidentally happens to also be the COPIED indicator, a copy operation is not necessary, as the current array was initialized to already contain that value.

In either case, if the value of array element X of the previous array is equal to the COPIED indicator, then the current array already has the same value that was stored in the previous array, and no copy operation need be performed. The process can then move to step 560, wherein the current array element X has the same value as the previous array element X, and the process can end.

If the value array element X of the previous array does not equal the COPIED indicator, the process continues on to step 525. At step 525, the CAS operation is used to store the value of array element X of the previous array, retrieved in step 515, into array element X of the current array, but only if the value of the current array element X is still the same as that retrieved in step 510. At step 530, the results of the CAS operation can be evaluated. If the CAS operation is successful, this means that the value in array element X of the current array has been successfully copied from array element X of the previous array, and the process can continue on to step 535.

If the result of the CAS operation is not successful, this means that somewhere between steps 510 and steps 525, another thread has modified the value of array element X of the current array. For example, this could occur when sometime after step 520, another thread runs and has already copied the value from the previous array element X to the current array, set the previous array element X to COPIED, and has modified the value of element X of the current array. However, in any case, the CAS operation did not succeed, and the process can return to step 510, and begin again. It should be noted that this time through, if the above scenario was what actually occurred, the retrieved value from the previous array element X should equal the copied indicator, and the process will move on to step 560. However, it is possible that more than one thread is exhibiting the behavior described above. In such a case, there may be multiple iterations of steps 510 through 530, once for each thread that simultaneously attempts to write to element X. Embodiments of the invention advantageously take into account that multiple threads may be operating on a single array element.

If the CAS operation at step 530 was successful, the process may proceed to step 535 and use the CAS operation to store the COPIED indicator into array element X of the previous array. The CAS operation will compare the value of array element X that was retrieved in step 515 with the value that is currently stored in array element X, and if they are the same, will store the COPIED indicator in array element X of the previous array.

At step 540, the result of the CAS can be examined. If the result indicates a successful CAS, this means that the COPIED indicator was successfully stored in array element X of the previous array. The process can then proceed to step 545. If the result indicates a failure, this means that at some point between step 515, when the value of the previous array element X was read, and step 535, another thread has changed the value stored in array element X of the previous array. Just as above, one possible way this can happen is if another thread reads, copies, and updates the value of array element X of the previous array at some point between steps 515 and 535. However, in any case, the CAS operation did not succeed, and the process can return to step 510, and begin again. Just as above, the second time through, the array element X of the previous array should indicate it has been copied, and the process continues on to step 560.

At step 545, the element count in the previous array can be atomically decremented. As explained above, in some embodiments the element count is set to the size of the array when it is created, and as such also indicates the number of elements that must be copied out when copying the array to a new array. Upon successfully copying array element X from the previous array to the current array, the element count can be reduced to indicate that one less element needs to be copied out. At step 550, the element count can be examined to determine if there are any more elements that need to be copied out of the previous array. If the count does not equal zero, this means that additional elements remain that need to be copied out of the previous array. The process can then proceed to step 560, where the value of current array element X has been successfully copied from the previous array. The process may then end.

If at step 550 the element count is determined to be zero, this means that all elements of the previous array have now been copied to the new array. As such, there is no longer a purpose for the previous array. The previous array reference in the current array can be cleared, such as by setting its value to NULL. In some programming environments, this can be an indication to the runtime system that the previous array is no longer needed, because no references to it exist. The memory used for the previous array object may then be reclaimed by the runtime system. The process may then continue on to step 560 and end.

Figure 6:
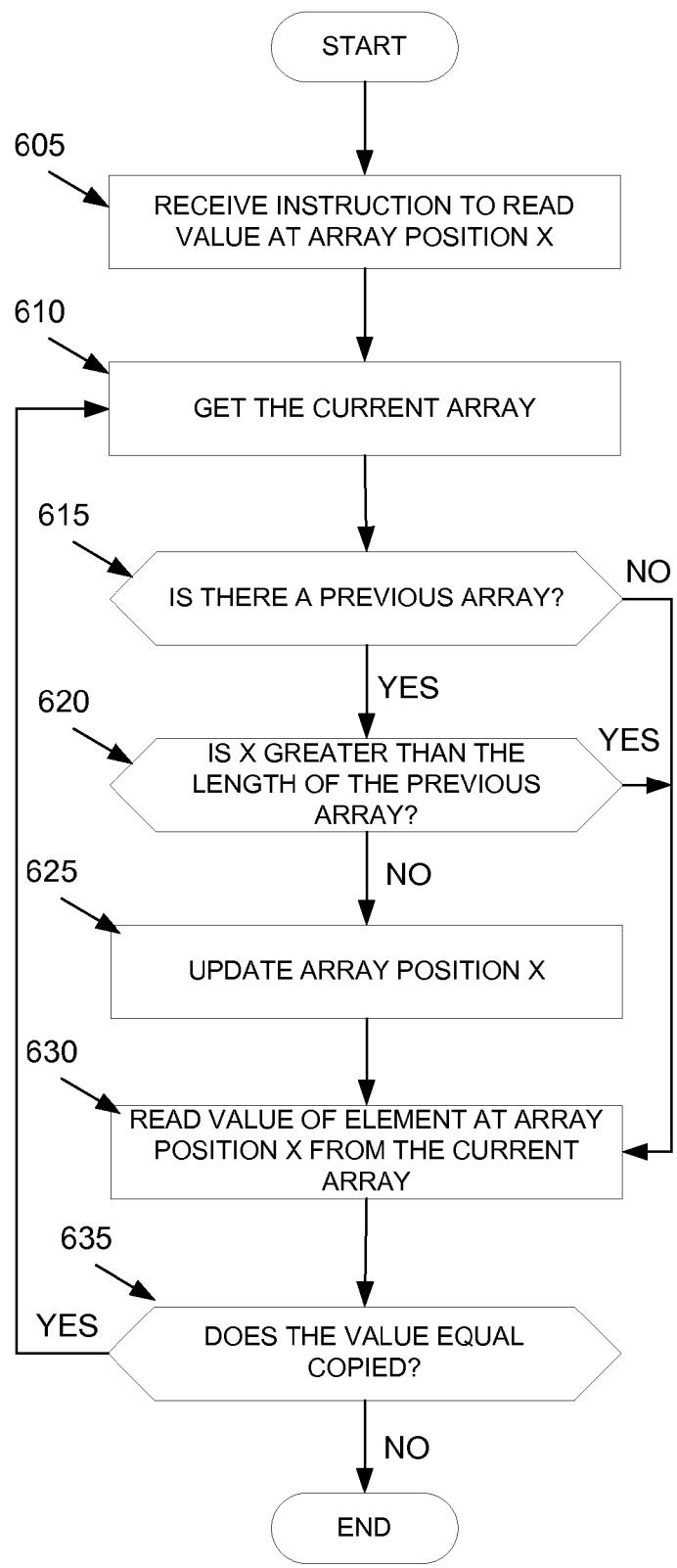
FIG. 6 depicts a simplified block diagram of the process of reading a value from a dynamic atomic array.

FIG. 6 depicts a simplified block diagram of the process of reading a value from a dynamic atomic array. The process may begin at step 605, wherein an instruction to read a value at a given array position X is received. The process then continues on to step 610, and the current array is retrieved. At step 615, the previous field of the current array can be examined to determine if there is a previous array. As should be clear from the preceding block diagrams, if the previous of the current array is pointing to a previous array, this means that another thread is currently operating on the array to perform a resize.

If there is not a previous array, the process moves to step 630 and the value of the element of the current array at position X is retrieved. The process then moves to step 635, wherein the value retrieved in step 630 is compared to the COPIED indicator. If the value is equal to the COPIED indicator, this means that at some point after step 615 a different thread has started the process of resizing the array, and the current array that was retrieved in step 610 is no longer valid. The process may then return to step 610, and start over, by obtaining what should be the correct current array. However, if the value does not equal the COPIED indicator, then the value retrieved at step 630 is accurate for array position X. For arrays that have the possibility of the COPIED indicator being a valid stored value, step 635 involves an additional comparison of the current array retrieved in step 610 with what is the current array at the time of execution of step 635. If the two arrays are equal, this means that there is not a copy in progress, and the retrieved value for position X just so happens to equal the COPIED indicator. The process may then simply end. If the two arrays are not equal, this means that a resize is in progress, and the process should return to step 610 to obtain the latest version of the current array.

If at step 615 it is determined that there is a previous array, the process then moves to step 620. At step 620, the position of X is compared with the length of the previous array. If the position of X is greater than the length previous array, this means that the current array is larger than the previous array, and there is no need to examine the previous array, because the array position X does not exist in the previous array. The process will continue on to step 630, and proceed as has been described in the previous paragraph.

If at step 620 it is determined that the position of X is not greater than the length of the previous array, the process moves to step 625. At step 625, array position X is updated, using the same process that was described with respect to FIG. 5. As was described therein, the update process of FIG. 5 will ensure that the value of an element of the previous array is copied to the current array. The process can then continue to step 630, and proceed through step 635, as has been described above.

The process that has been described with respect to FIG. 6 advantageously allows all threads of a program to continue to make progress, and thus remain wait-free, even in situations where the array is being resized. For example, a first thread may decide to increase the length of the array. As explained in FIGS. 3-5, the first thread will create a new array, copy all the values from the old array, one at a time, to the new array, and then once completed, will delete the old array. If a second thread wishes to read a value of the array that has not been copied from the previous array to the new array yet, the second thread is not required to wait for the first thread to complete the copying. Rather, the second thread can individually update the element of interest, thus ensuring the value read from the current array is the correct value. Furthermore, by updating the individual element independently, the second thread has also advantageously reduced the amount of processing required by the first thread. When the first thread attempts to copy the individual array element from the previous array to the current array, it will be able to determine that the element has already been copied. The first thread can then simply move on to the next element in the previous array. In this manner, multiple threads advantageously work in parallel to copy the elements, speeding up the entire copy process.

Figure 7:
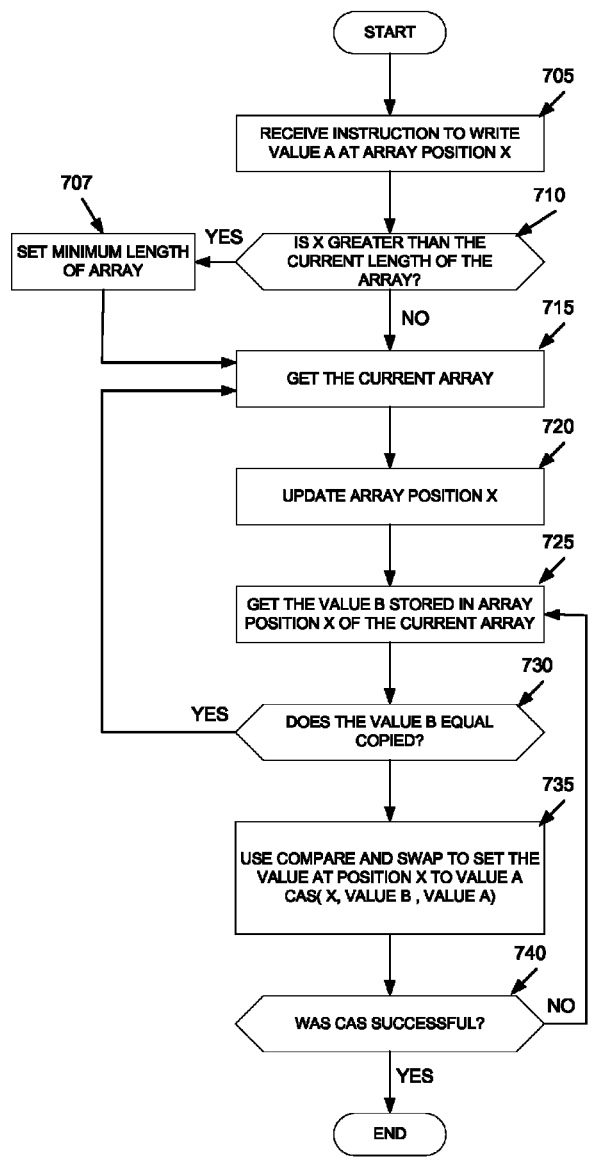
FIG. 7 depicts a simplified block diagram of the process of writing a value to a dynamic atomic array, wherein the array must increase in size.

FIG. 7 depicts a simplified block diagram of the process of writing a value A to a dynamic atomic array, wherein the array may need to increase in size to accommodate the write operation. The process may begin at step 705, wherein an instruction to write a value A at a specific array position X is received. At step 710, the position of X is compared with the size of the current array. If the position of X is larger than the size of the current array, this means that the array must be resized to be larger than its present size. The process will continue on to step 707, wherein the current array will be resized according to the process that was described in FIG. 3(a). In either case, the process will eventually continue on to step 715, wherein the current array is retrieved.

The process moves on to step 720, wherein position X of the current array is updated according to the process that was described in FIG. 5. This update ensures that the most up-to-date value is stored in element X of the current array. At step 725, the value that is stored in the current array at position X is retrieved, and can be referred to as value B.

At step 730, value B is compared to the COPIED indicator. If value B is equal to COPIED, this means that another thread has resized the array at some point after step 715. In embodiments where the COPIED indicator could also be a valid value, an additional check is performed to compare the current array retrieved in step 715 with what is now the current array. If the current array retrieved in step 715 is not the same as what is now the current array, another thread has resized the array and has already copied out the value. The end result being that the current array that was retrieved in step 715 is no longer the current array. The process then will return to step 715 to get the latest current array, and start over.

At step 735, the CAS operation is used to store value A in element X of the current array, if the value of the current array element X is the same as the value B. This comparison ensures that no other thread has changed the value stored in position X of the current array between steps 725, where the value B was retrieved, and the current step 735. At step 740, the results of the CAS operation are examined. If the CAS was not successful, this means that another thread has modified the value stored in position X of the array some time after the value B was retrieved in step 725. The process returns to step 725 to retrieve the latest value stored in position X of the array, and tries again. If the results of the CAS operation are successful, this means that the value A has been successfully written to element X of the current array, and the process can then complete.

Figure 8:
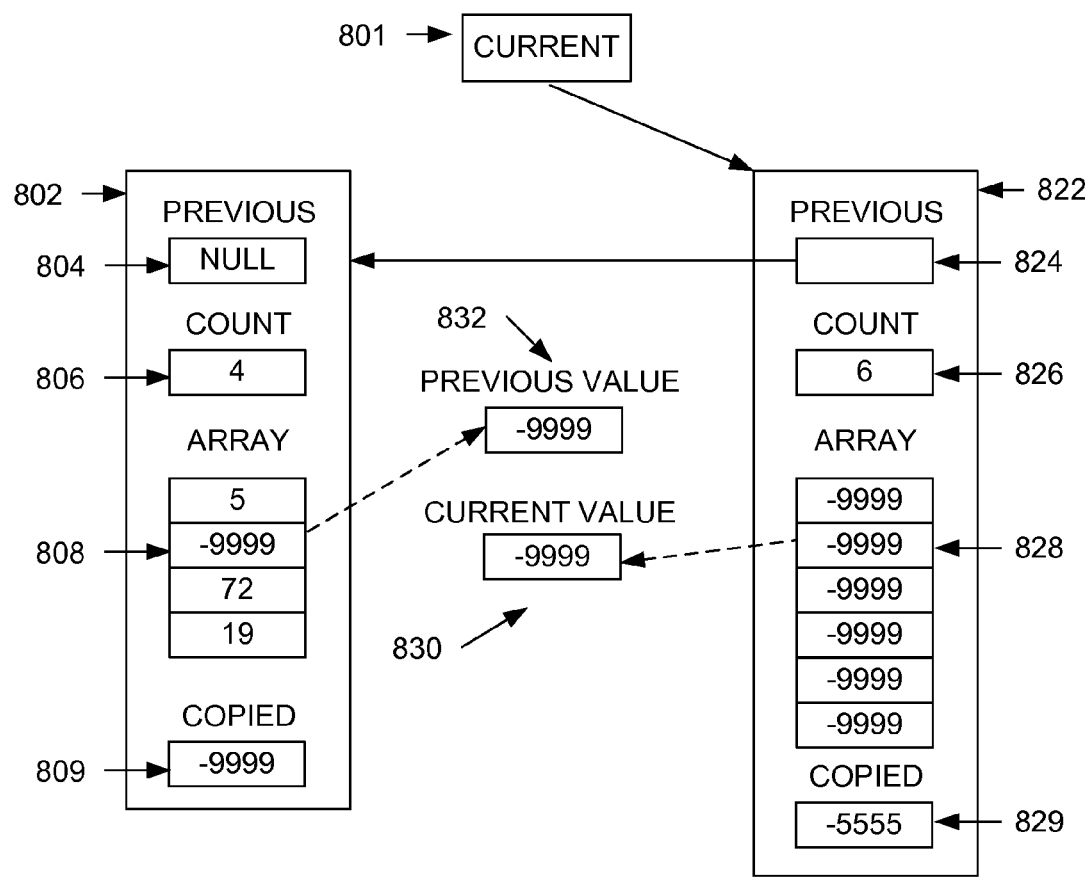
FIG. 8 depicts the use of a COPIED indicator whose value is also a possible data value.

FIG. 8 depicts the use of a COPIED indicator whose value is also a possible data value. FIG. 8 is very similar to FIG. 2(a) with the exception that each array has a defined value of the COPIED indicator 809, 829. As explained above, the value may be chosen such that it is unlikely to be a naturally occurring value. For example, for an integer, a large, negative number may be chosen. For a character array, a seldom used character may be chosen. Each newly created array will have a distinct value chosen for the COPIED indicator, as shown by the different values 809, 829.

When a new array is created for purposes of growing or shrinking the array, the values of all elements of the new array 828 can be initialized to the value of the COPIED indicator 809 of the previous array 802. A thread wishing to access the second element of array 828 may read the previous value 832 from the previous array 808 as well as the current value 830 from the current array 828. When the previous value 832 is compared to the COPIED indictor 809, it can not be determined if the value indicates the element has already been copied, or if the value, by pure chance, happens to equal the COPIED value.

Because the array 828 was initialized to the COPIED indicator of the previous array 202, it does not matter that the thread attempting to access the array 828 cannot determine if the element has already been copied. This is because regardless of if it has already been copied, or just so happens to equal the COPIED indicator, the same value is already present in the current array 828. The thread can simply read the current value 830.

Each new array is given a unique value of the COPIED indicator such that there is no confusion with respect to if an element has been copied from a previous array, or just so happens to equal the COPIED value.

BitSets

The description above has been generally focused on dynamic atomic arrays for data types such as integers, floats, and references. However, there is another data structure that is often used in modern programming, the bitset. Most modern programming languages provide for bitsets. For example, the Java programming language provides the bitset object to implement bitsets that can grow in size. A bitset, sometimes referred to as a bit array, is a vector of bits, each of which has a Boolean value. As implied by the name, each element in the array can be represented by a single bit.

Just as with dynamic arrays of other data types, bitsets as provided by the programming language are not thread safe. One possible way of overcoming this deficiency is through the use of a dynamic atomic array, such as a dynamic atomic integer array, as described above. Each bit of the bitset would be an element of the array. The array could grow and shrink, while being threadsafe, as described above. Although this solution is perfectly acceptable from the perspective of providing dynamic, atomic, bitsets, the solution may not be optimal for a providing a bitset with the same functionality as existing non-atomic bitsets.

For example, an integer on most computing systems is 4 bytes (32 bits) long. An individual element of a bitset, is exactly as the name implies, a single bit. Thus using a dynamic atomic integer array to implement a bitset wastes 31 of the 32 available bits. Furthermore, some operations that are performed on a bitset require an instantaneous snapshot of the current state of the bitset. For example, one typical operation is counting the total number of bits in the bitset that are currently set to true. If a dynamic atomic integer array were used to implement a bitset, this would require iterating through each integer element of the array, to determine if the value is true or false. In a multi threaded process, a second thread may alter a value that has not yet been counted by a first thread during the period of time the first thread is iterating through each element. Thus, the first thread does not get an accurate count of the number of bits set to true as of the time the operation was executed.

Figure 9A:
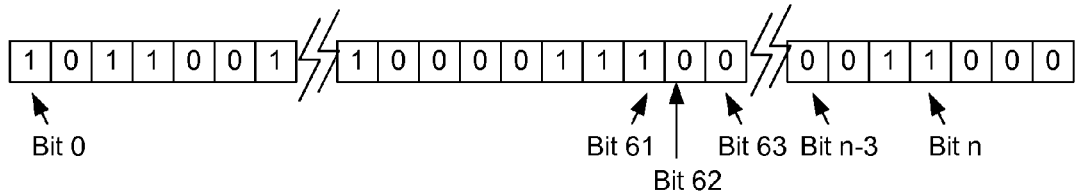
FIG. 9(a-c) depicts a bitset.

FIG. 9(a) is a logical depiction of a bitset. The bits are simply numbered from 0 to n. A individual bit is referenced by a bit offset. Bitsets typically provide methods for setting, clearing, and inverting an individual bit. The method takes in as a parameter the specific bit offset and performs the desired operation. As explained above, a naive approach to implementing a bitset could simply use an array of integers, with each element of the array representing a single bit. The array element that contains the value for the bit would then simply be the bit offset. For example, the $3^{rd}$ array element would contain the value for the third bit offset. As explained above, for a typical system, this would mean that 31 of the 32 bits of an integer are wasted. Even if a smaller data type, such as a character (8 bits on most systems), was used for the array, 7 of the 8 bits would still be wasted. A byte (8 bits) is typically the smallest granularity of memory access offered by most systems, thus using a primitive data type for storage of a bitset in an array wastes at least 7 bits out of every byte.

Figure 9B:
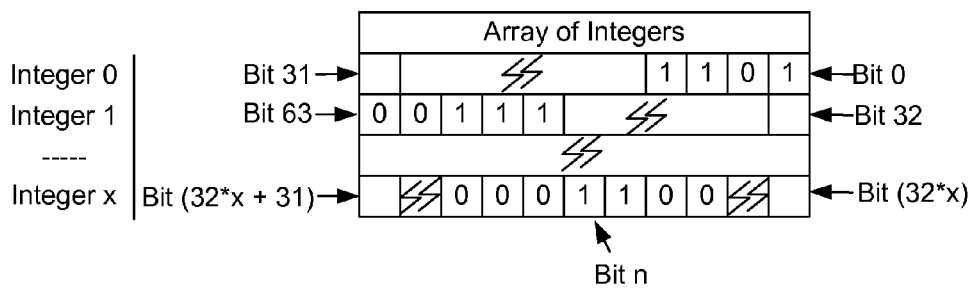

FIG. 9(b) is a logical depiction of a bitset packed into an array of integers. In some embodiments, the elements of the array will be stored in an atomic array of integers. As explained above, by using the already existing atomic integer array, the atomic methods for accessing the array elements can be reused. The functionality of allowing the bitset to be dynamic is described by the present disclosure. A more sophisticated approach to using an array of integers to store a bitset would pack as many bits as possible into each element of the array. For example, if an integer is 32 bits long, each element of the array would hold value for 32 bits of the bitset. Thus, the first array element would hold bits 0 through 31, the second array element would hold bits 32-63 and so on. Packing the bits into an integer adds a level of complexity in managing the bitset. A program using the bitset would typically refer to an element of the bitset by its bit offset. This offset then needs to be converted to an integer offset to determine which array element is storing that particular bit offset. Within the array element, it must then be determined which bit of the 32 bits is storing the value of the specified bit offset. The ability to set, clear, or invert a particular bit, without altering the other bits must then be provided.

The conversion of a bit offset to an integer offset is straightforward. By dividing the bit offset by the size of an integer, the particular array element that stores the bit offset can be determined. Referring to FIG. 9(b), if it is desired to know the array element containing bit offset 63, the bit offset is simply divided by 32, and the remainder is discarded. In this case, the result is 1, indicating that bit offset 63 is stored in array element 1. At this point, it needs to be determined the offset within the integer that stores the bit offset. To find the offset within the integer, the array element index is multiplied by the size of the array element. In this example, the array element index is 1 and the size of the array element is 32 bits. This number is then subtracted from the bit offset of 63, resulting in 31.

In order to operate on only the $31^{st}$ bit of the integer, a mask is created by performing a bitwise shift left of the value 1 by the offset within the integer. This results in an integer that only has one bit set, and that bit is the offset within the integer. If it is desired to set the bit to true, a bitwise or is performed with the integer stored in that array element. This will set the bit, regardless of whether it was previously set or not, while not altering the values of any of the other bits. If it is desired to clear the bit, the mask is inverted, and then a bitwise and is performed. This results in setting the bit to false, without altering the values of any of the other bits.

Although this packing mechanism overcomes the problem of wasting bits when storing a bitset as an array of integers, it presents other problems when trying to implement a dynamic atomic bitset. As explained above with respect to FIG. 2, when a dynamic atomic array is being resized, each array element is copied from the previous array to the current array. Once the copy is complete, a COPIED indicator is stored in the previous array to alert other threads that the value stored therein has been copied to the current array, and is no longer valid. This leads to several problems. First, if all of the bits of each integer are used to store values of the bitset, there is no value that can be used as the COPIED indicator. For example, if the COPIED indicator is the value 0xFFFFFFFF it is not possible to differentiate between an array element set to COPIED and one that just so happens to have all bit offsets within that array element set to true. The same holds true regardless of what value is used as the COPIED indicator. This problem could be resolved in a manner similar to that depicted in FIG. 8, by initializing the new array to the value of the COPIED indicator, such that it does not matter if the element was copied, or just so happens to equal the COPIED indicator.

That solution does not address a more serious problem, in that the use of the COPIED indicator is destructive in the sense that once the value is copied to the new array, it is no longer possible to determine what the value was in the previous array. For example, if previous array element 2 contains the value 0xff, and this value is copied to the new array, previous array will now have the COPIED indicator stored in previous array element 2. It is no longer possible to determine what the value had been. This becomes a problem in the case of a bitset, because for some operations (which will be discussed in more detail below) a snapshot of the array must be taken. If one thread is in the process of taking a snapshot, and a different thread is at the same time destructively copying out elements of the previous array, the snapshot may not accurately reflect the bitset at the time the snapshot was requested. The use of a snapshot will be discussed in further detail below.

Figure 9C:
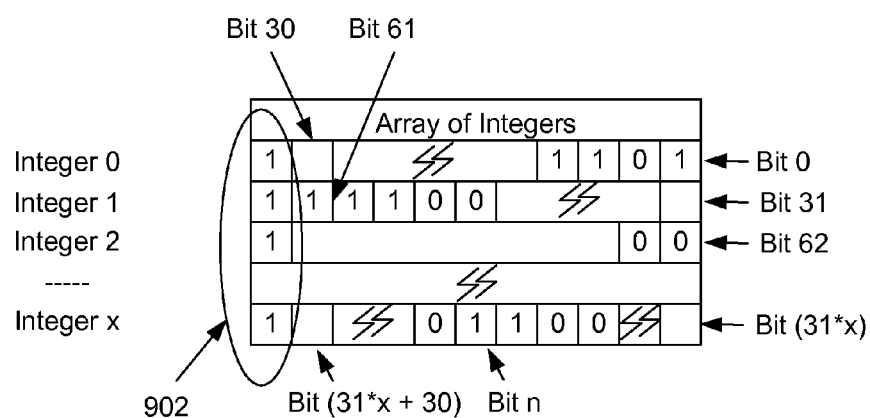
Figure 10A:
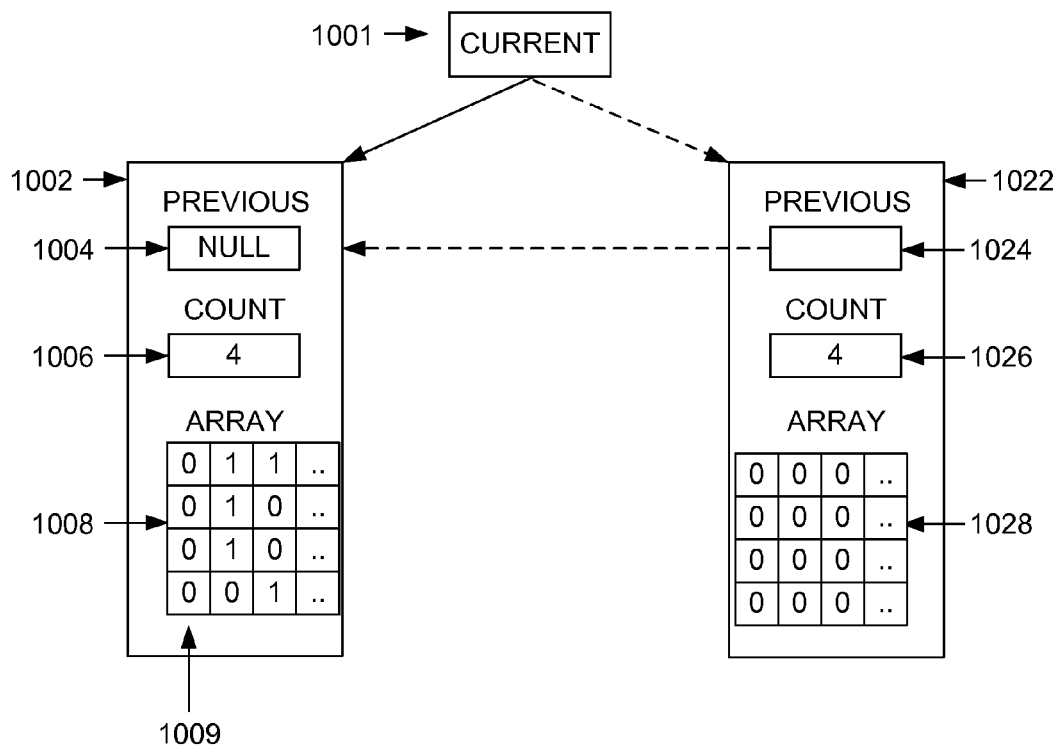
FIG. 10(a-d) depicts taking a snapshot of a dynamic atomic bitset.
Figure 10B:
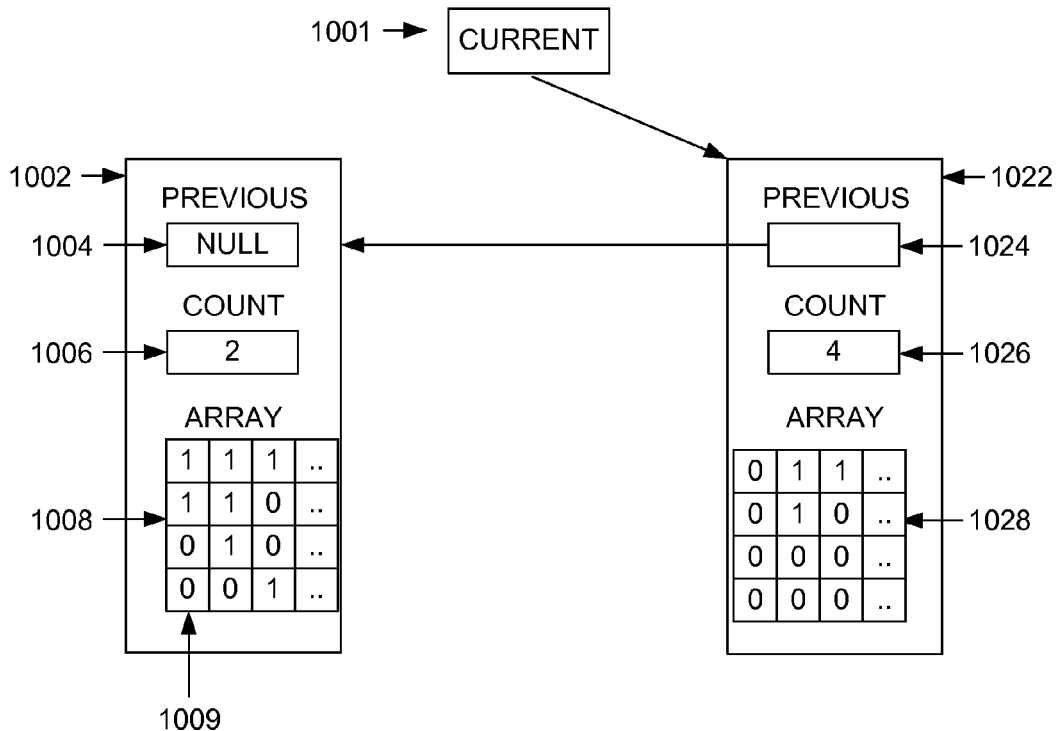
Figure 10C:
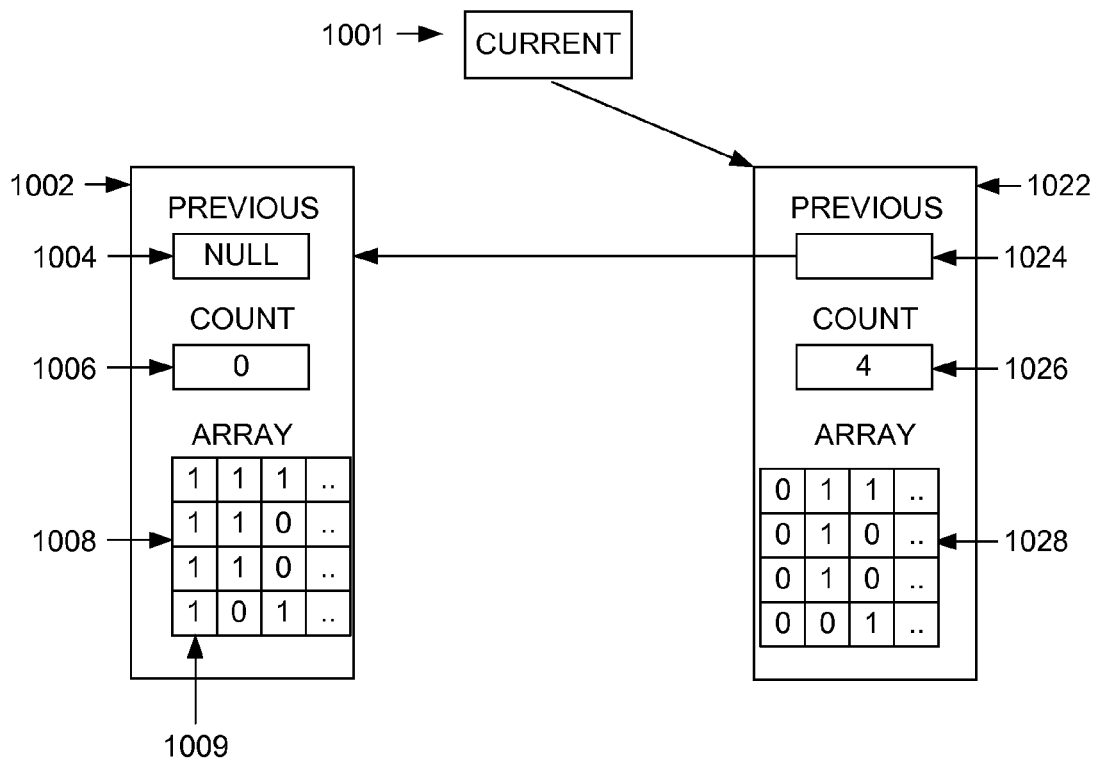
Figure 10D:
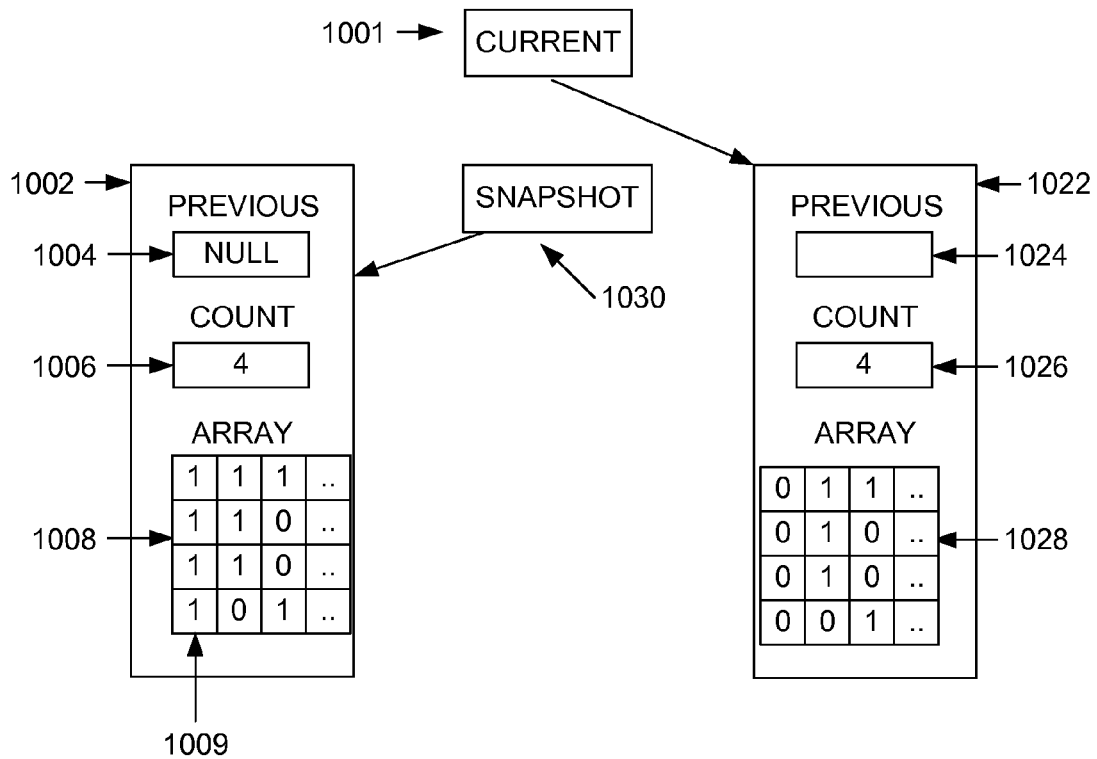

FIG. 9(c) is a logical depiction of a bitset packed into an array of integers with a reserved bit for a COPIED indicator. Embodiments of the present disclosure overcome the problem that the COPIED indicator is destructive by reserving a bit of each array element to act as the COPIED indicator. In some embodiments, to make indexing into the bitset less complicated, the high order bit of each array element is reserved to serve as the COPIED indicator. As shown in FIG. 9(c), the high order bit 902 of each element of the array is reserved to act as an indictor to determine if the array element has already been copied. Advantageously, because the high order bit is not used to store data values for the bitset, the element can be marked as copied without destroying the values that were stored in the remaining bits. The reason for this will be discussed in further detail below.

Because the high order bit of each array element is reserved to act as the COPIED indicator, some slight modifications are necessary when converting a bit offset to an array element, and an offset within that array element. For example, rather than dividing the bit offset by the size of an integer, the divisor will be the number of bits that are used to actually store values for the bitset. If an integer is 32 bits, the divisor will then be 31, because only 31 bits will be used to store data values. Similarly, when computing the offset into a specific array element, rather than multiplying by the size of an integer, the multiplier is simply the number of bits, in this example 31, that are used to store actual data values.

With this slight modification, growing and shrinking dynamic atomic bitsets occurs the same way as described above with respect to FIGS. 2-7. If a bit offset is computed to be stored in an array element that is beyond the end of the current array, the same process as discussed above to enlarge the array is performed. A new array is created, and each integer from the previous array is copied to the new array.

However, once the copy of an element has occurred, instead of replacing the entire array element with a COPIED indicator, only the copied indicator bit is set. This bit signals to other threads that the array element has already been copied to a new array. Advantageously, the value that was stored in the previous array element is not destroyed. The reason that it is advantageous to not destroy the previous value stored in the array element will become clearer as the functionality provided by non-atomic bitsets is described further.

Bitsets today typically provide certain functionality that would not make sense with data elements such as integers, floats, or references. For example, a bitset will typically provide a method for determining (i.e. counting) the number of bits that are currently set to true in the entire bitset. For a non-atomic bitset operating in a single threaded program, this operation is trivial. Each element of the array of integers that is storing the bitset is iterated, and for each element, the total number of bits that are set to true are counted. A running total is maintained, and at the end of the iteration, the running total equals the number of bits in the entire bitset that are set to true.

In a multi-threaded process, this simple scheme no longer works. If a first thread invokes a method to determine the number of bits that are currently set to true in the bitset, at some point during the iteration process a second thread may change one of the bits. If the particular array element that is changed has not yet been counted by the first thread, the first thread will get an inaccurate count of the number of bits that are set to true. For example, a first thread may wish to know the number of bits set to true at the moment in time that the method is invoked. If a second thread changes one of the values in the bitset while the first thread is still counting the number of set bits, an inaccurate result may be obtained. If the array element that is changed by the second thread is changed after that particular element was counted by the first thread, the result will be accurate. However, if the array element has not yet been counted, the result will be incorrect, because the change made by the second thread did not exist at the time the first thread requested the count of bits set to true.

In order to overcome this problem, the ability to take a snapshot of the bitset at the time of the request is needed. This snapshot should be unchanging in that no other thread should be able to modify the values stored in the snapshot. Other threads that need to continue to do work will operate on the real bitset, not the snapshot. The snapshot, because it is unchanging, can then be used in methods such as the counting method described above. Because the snapshot does not change, the count will be accurate as of the moment the snapshot was taken.

FIG. 10(*a*) depicts the process of taking a snapshot. FIG. 10(*a*) is very similar to FIG. 2(*a*), wherein an array of integers is enlarged. For purposes of simplicity, only the first few bits of each element of the array 1008 is shown. First, a new array 1022 is created, and the previous pointer of the new array 1022 is set to point to the array 1002 that is being pointed to by current 1001. This process occurs exactly as it does with respect to FIG. 2(*a*), except that the size 1026 of the new array 1022 is the same as the size 1006 of what is the current array 1002. Current 1001 is then changed, using the compare and swap instruction, to point to the new array 1022, just as before.

FIG. 10(*b*) depicts the process of copying to the new array. Each array element from the previous array 1002 is then copied to the current array 1022, using the same process as was explained with respect to FIG. 2. The only difference being that once an element is copied to the new array 1022, rather then destroying the value that was stored therein with a COPIED indicator, the copy indicator bit 1009 is set to true.

As shown in FIG. 10(*b*), the first two elements of the array of integers 1008 have been copied to the current array of integers 1028. As shown by count 1006, only two elements remain to be copied.

FIG. 10(*c*) depicts the array after all elements have been copied. As shown, the count 1006 indicates that there are no more elements of array of integers 1008 left to be copied out of the previous array 1002. However, what should be noticed is that the previous array of integers 1008 has not been destroyed. The only change to each element of the array of integers 1008 is that the copy indicator bit 1009 for each element is set to true. The actual data that is stored in each element is not altered, and is thus a snapshot of the previous array 1002, taken at the time the new array 1022 was created. Because current 1001 is pointing to the new array 1022, any other threads that are modifying the bitset will make changes to the current array 1022, not the previous array 1002.

FIG. 10(*d*) depicts the snapshot. As shown in FIG. 2(*f*), once all of the elements of previous array are copied to current array, the previous pointer of the current array can be set to null. Because there are no more references to the previous array, the operating system will release the memory occupied by the previous array. However, this does not happen when taking a snapshot. Rather then remove all references to the previous array, snapshot 1030 will be set to point to the previous array 1002, prior to setting the previous pointer 1024 to NULL. By doing this, there will still be a reference to previous array 1002, such that the operating system will not release the memory associated with previous array 1002. Previous array 1002 can now be referenced by snapshot 1030, and snapshot 1030 is an exact copy of the data that was stored at the instant in time the new array 1022 was created, with the exception that the copied bit 1009 of each array element 1008 is set to true.

Figure 11:
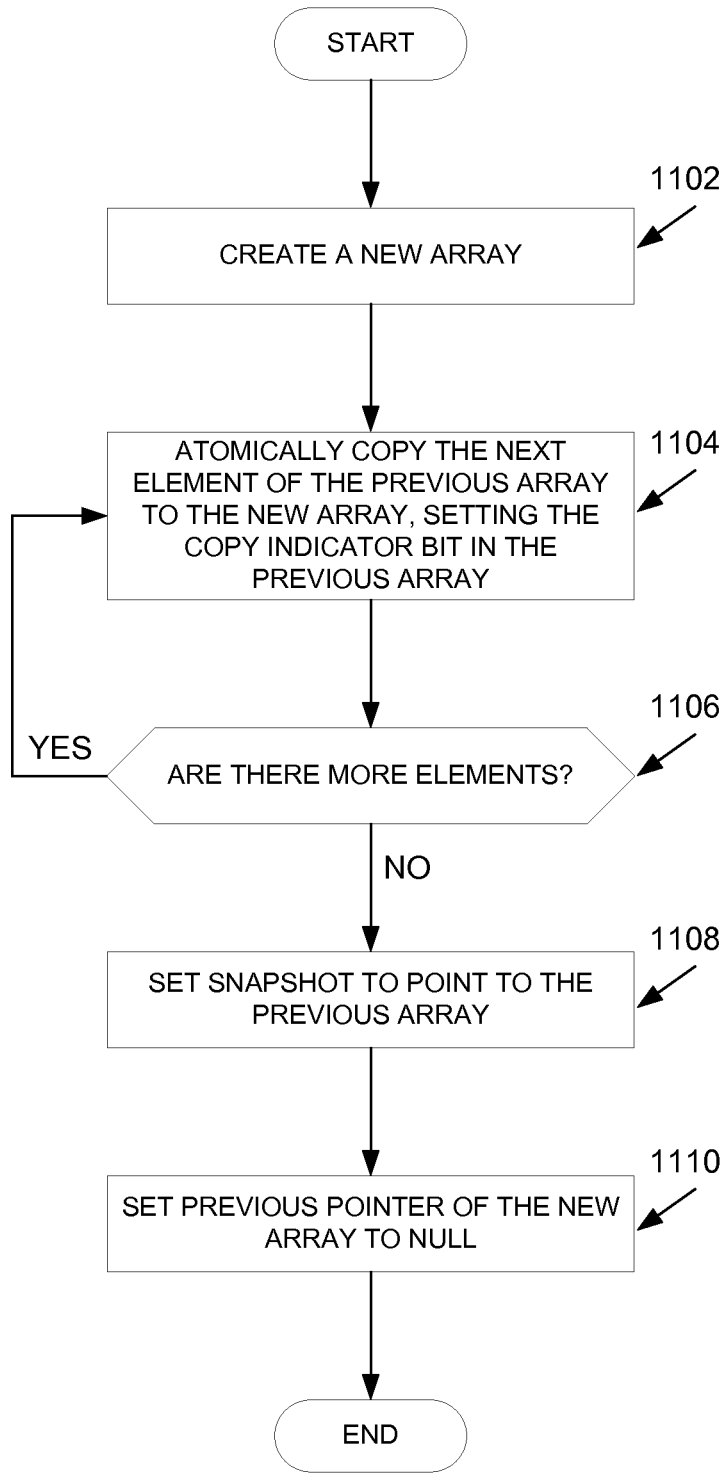
FIG. 11 depicts a flow diagram of creating a snapshot.

FIG. 11 depicts a flow diagram of creating a snapshot. The process starts at step 1102 in which a new array is created. The previous pointer of the new array is set to point to the previous array. The new array is then set to be the current array. The process of creating a new array is almost identical to that depicted in FIG. 3(*a-b*) with the exception that the new array is the same size (as opposed to being larger or smaller) than the current array. The same steps occur, utilizing the CAS operation to ensure that no other thread is simultaneously attempting to operate on the Bitset.

At step 1104, an element of the previous array is copied to the new array. As an element is copied, the copied indicator bit of the element is set to true. In essence, step 1104 is the same process that is depicted in FIG. 5, with two exceptions. The first exception is that instead of indicating that an element is copied by replacing the entire element with a COPIED indicator, only a copied indicator bit is set. The second exception is that if no more elements remain to be copied, the previous pointer is not set to NULL. The use of the CAS operation to ensure that no other threads are simultaneously manipulating the array is just as depicted in FIG. 5. At step 1106, it is determined if there are more elements to be copied. If there are more elements, the process returns to step 1104, and the next element is copied to the new array.

If there are no more elements remaining to be copied, at step 1108, snapshot is set to point to the previous array. At step 1110, the previous pointer of the new array is set to NULL. At this point, snapshot points to an array that is an exact copy of the previous array, with the exception that all the copied indicator bits are set, as it looked at the instant the snapshot was taken. The snapshot can then be used in methods that require the array to be unchanging.

Figure 12A:
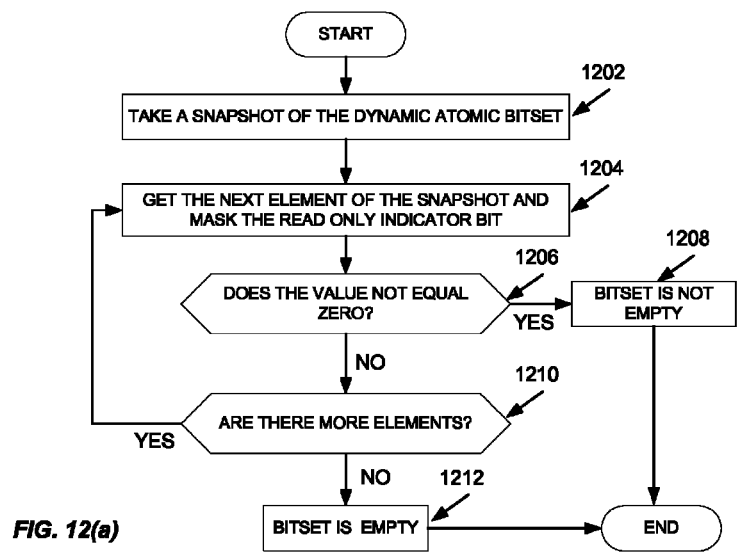
FIG. 12(a-c) depicts flows for methods performed on bitsets.

FIG. 12(a) depicts a high level flow of the is Empty( ) method. As briefly described above, there are several methods provided by non-atomic bitsets that are advantageously also provided by the dynamic atomic bitset. One such method is the is Empty( )method. As implied by the name, the is Empty method determines if no bits in the bitset are set to true. The process begins at step 1202, wherein a snapshot of the dynamic atomic bitset is taken. As described above, once a snapshot is taken, the snapshot remains unchanging, and is an exact copy of the bitset at the instant the snapshot was taken. Thus, other threads can continue to operate on the real bitset, without having any impact on the snapshot. After the snapshot is taken, the process continues on to step 1204 where the next element of the array is retrieved, and the copied indicator bit is masked. Masking the copied indicator bit is simply a case of creating an integer whose value in the copied indicator bit position is 1, and is zero for all other bits. This value is then inverted and bitwise and is performed with the array element. At step 1206, it is determined if the result is non-zero. If it is non-zero, this means that at least one bit is set, and thus the bitset cannot be empty, and the process moves to step 1208. If the result is zero, that means that no bits are set for this array element. At step 1210 it is determined if there are more elements of the array. If so, the process returns to step 1204, and the next element of the array is retrieved. If there are no more elements, the bitset is empty, because no element was found with a non-zero value. The process moves to step 1212 and ends.

Figure 12B:
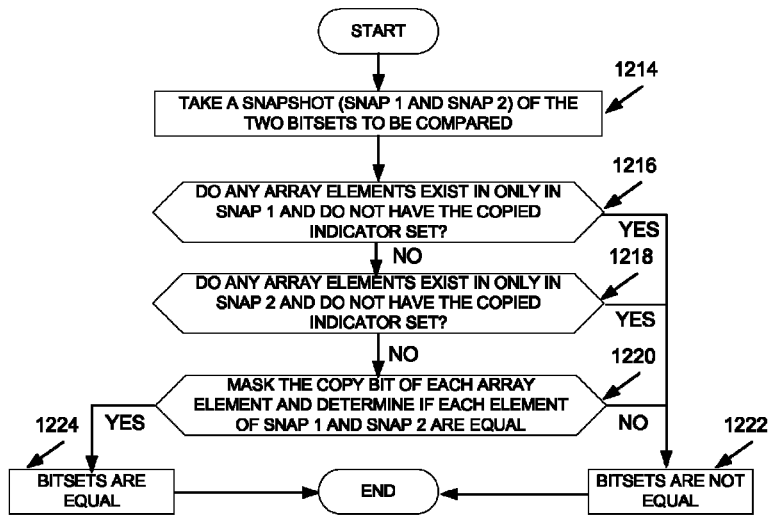

FIG. 12(b) depicts a high level flow of the equals( ) method. The equals( ) method will compare two bitsets at an instant in time, and determine if the two bitsets are equal, at that moment in time. The process begins at step 1214 where snapshots of the two bitsets that are to be compared are taken. As should be understood, these snapshots are unchanging representations of the bitset, at the time the snapshot was taken. At step 1216, it is determined if snap 1 contains any elements that are not also contained in snap 2, and if those elements do not have the copied indicator bit set. If so, this means at least one bit offset in the first bit set is set to true, and the bit offset does not exist in snap 1. As such, the two bitset cannot be equal, so the process continues to step 1222, and ends.

At step 1218, the same comparison as was done in step 1216 is done for snap 2. Again, if any bit is set in snap 2 that does not exist in snap 1, the two bitset cannot be equal and the process continues to step 1222, and ends. Finally, at step 1220 the copied bit of each element of the snapshot is masked, and the elements are compared. The reason the copied bit is masked is because the copied bit is not actually part of the bitset, but is only an indicator. If each element of both snapshots is equal, then the two bitsets are equal, and the process moves to step 1224 and ends. Otherwise, the two bitsets are not equal, and the process continues to step 1222, and ends.

Figure 12C:
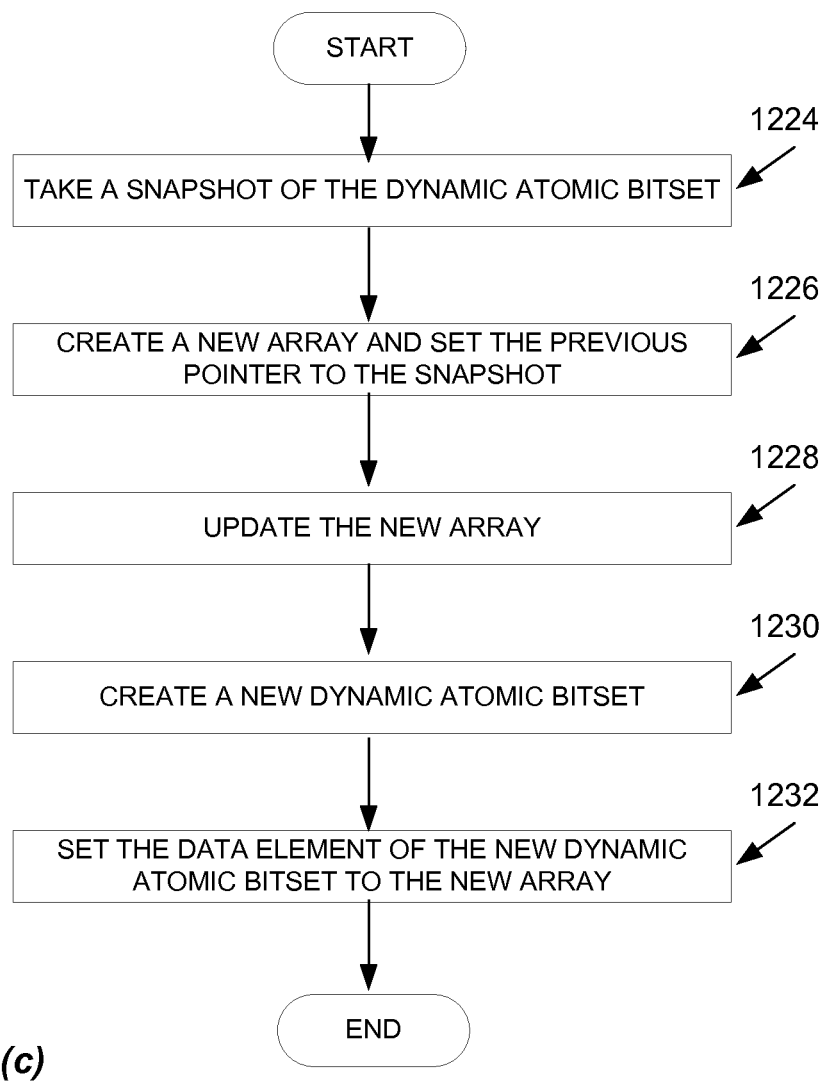

FIG. 12(c) depicts a high level flow of the clone( ) method. In some cases, it is desired to obtain a complete copy of a dynamic atomic bitset that can itself be used as a dynamic atomic bitset. The description up until now has created a snapshot of the atomic integer array that is used to store the values of the bitset, but the snapshot itself is not a dynamic atomic bitset. However, through the use of the snapshot, the task of cloning a dynamic atomic bitset can be accomplished. The process begins at step 1224, wherein a snapshot is taken of the source dynamic atomic bitset. This snapshot represents the bitset at the time the clone( )method is executed. At step 1226, a new array is created, and the previous pointer of the new array is set to the snapshot. At step 1228, the update method, which is described with reference to FIGS. 4 and 5, is executed. The reason that the update method is executed is that this copies all of the data values from the snapshot to the new array, while at the same time clearing out the copied indicator bit. At step 1230, a new dynamic atomic bitset is created. At step 1232, the new array that was created in step 1226 is set as the data element of the new dynamic atomic bitset. At this point, the new dynamic atomic bitset is an exact copy of the original dynamic atomic bitset, as it existed at the exact instant the clone method was executed.

As described above, the use of a snapshot to create an unchanging copy of the bitset at the time of creation of the snapshot as well as the ability to clone a dynamic atomic bitset, allows the dynamic atomic bitset to implement all of the functionality of a regular bitset. Whenever operation on an unchanging version of the bitset is needed, a snapshot or clone of the dynamic atomic bitset is created, and the operation is performed on the snapshot or clone. Because the snapshot or clone is not subject to alteration by other threads, the results of these operations will be accurate as of the time the operation was executed. Two simple methods, the is Empty( ) and equals( ) method were described above, however embodiments of the invention also implement other methods of standard bitsets.

For example, the hashCode( ) method is used to create a hashcode for a dynamic atomic bitset. A snapshot is taken, and the hashcode is computed from the snapshot. As such, the hashcode is created for the bitset at the exact instant the method is executed, even if other threads alter the bitset. Similarly, the logicalSize( ) methods returns the bit offset of the highest bit offset that is set to true. Again, a snapshot is taken, and the offset is computed. As such, any alterations to the dynamic atomic bitset that occur after the method is invoked do not alter the result. The offset determined will be the offset at exactly the instant the method was executed. Any time an operation is desired that needs a view of the entire bitset at once, a snapshot or clone of the dynamic atomic bitset is created, and the operation is performed on the snapshot or clone.

Figure 13:
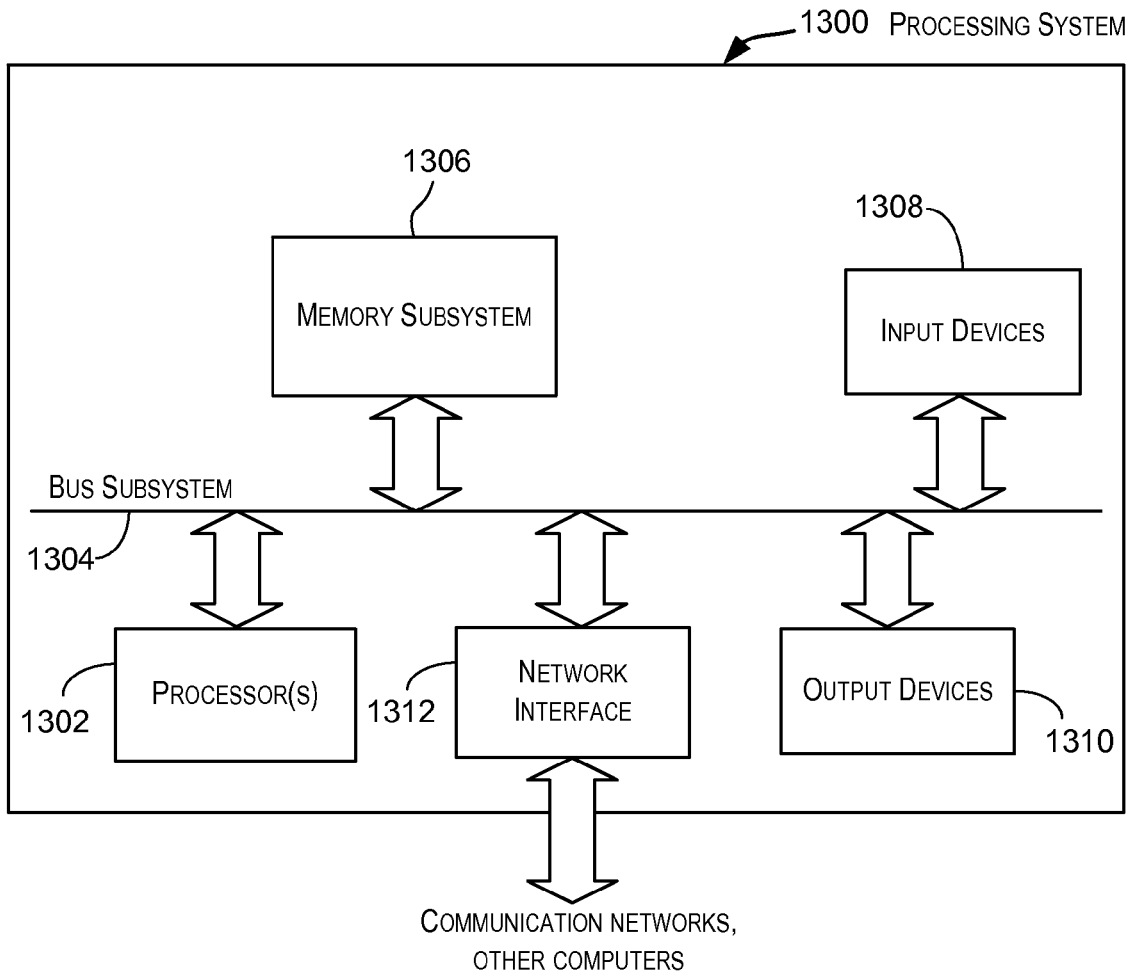
FIG. 13 depicts a simplified block diagram of a computer on which embodiments of the present invention may operate.

FIG. 13 is a simplified block diagram of a processing system 1300 that may be used to practice an embodiment of the present disclosure. System 1300 may be utilized to execute software containing dynamic atomic arrays.

As shown in FIG. 13, system 1300 includes a processor 1302 that communicates with a number of peripheral devices via a bus subsystem 1304. These peripheral devices may include a memory subsystem 1306, input devices 1308, output devices 1310, and a network interface subsystem 1312. Bus subsystem 1304 provides a mechanism for letting the various components and subsystems of system 1300 communicate with each other as intended. Although bus subsystem 1304 is shown schematically as a single bus, alternative embodiments of the bus subsystem may utilize multiple busses.

Processor 1302 is configured to perform processing performed by system 1300. For example, processor 1302 may be configured to execute programs, code, or instructions to perform operations according to an embodiment of the present invention. Processor 1302 may also control other subsystems or devices.

Input devices 1308 enable a user to interact with and provide information to system 1300. Input devices 1308 may include wired or wireless devices such as a keyboard, pointing devices such as a mouse, trackball, touchpad, or graphics tablet, a scanner, a touch screen incorporated into the display, audio input devices such as voice recognition systems, microphones, and other types of input devices. In general, an input device may refer to any device or mechanism that may be used for inputting information to system 1300. Input devices 1308 typically allow a user to select objects, icons, text and the like that appear on a monitor via a command such as a click of a button or the like.

Output devices 1310 may include wired or wireless devices such as a display subsystem, a printer, a fax machine, or non-visual displays such as audio output devices, etc. Examples of a display subsystem include a cathode ray tube (CRT), a flat-panel device such as a liquid crystal display (LCD), a projection device, etc. In general, an output device may refer to any device or mechanism for outputting information from system 1300.

Network interface subsystem 1312 provides an interface to other computer systems, and networks. Network interface subsystem 1312 serves as an interface for receiving data from other sources and for transmitting data to other sources from system 1300. Embodiments of network interface subsystem 1312 include an Ethernet card, a modem (telephone, satellite, cable, ISDN, etc.), (asynchronous) digital subscriber line (DSL) units, FireWire interface, USB interface, and the like. For example, subsystem 1312 may be coupled to a computer network, to a FireWire bus, or the like. In other embodiments, network interface subsystem 1312 may be physically integrated on the motherboard of system 1300, and may be a software program, such as soft DSL, or the like.

Memory subsystem 1306 provides a computer readable medium for storing the basic programming and data constructs that provide the functionality of the present invention. For example, memory subsystem 1306 may provide a computer-readable medium for a program, code modules, or instructions implementing the functionality of the present invention. These software modules may be executed by processor(s) 1302. Memory subsystem 1306 may also provide a repository for storing other data used in accordance with the present invention.

Memory subsystem 1306 may include a number of memories including a main random access memory (RAM) for storage of instructions and data during program execution and a read only memory (ROM) in which fixed instructions are stored. RAM is generally semiconductor-based memory that can be read and written by processor 1302. The storage locations can be accessed in any order. RAM is generally understood to refer to volatile memory that can be written to as well as read. There are various different types of RAM.

Memory subsystem 1306 may also comprise subsystems that provide persistent (non-volatile) storage and caching for program and data files, and may include a hard disk drive, a floppy disk drive along with associated removable media, a Compact Disk Read Only Memory (CD-ROM) drive, an optical drive such as a DVD, removable media cartridges, flash memory, and other like storage media.

Processing system 1300 can be of various types including a personal computer, a portable computer, a workstation, a network computer, a mainframe, a kiosk, or any other data processing system. Due to the ever-changing nature of computers and networks, the description of system 1300 depicted in FIG. 13 is intended only as a specific example for purposes of illustrating the preferred embodiment of a processing system. Many other configurations having more or fewer components than the system depicted in FIG. 13 are possible. For example, the processing system may be a desktop computer, portable computer, rack-mounted or tablet configuration. Additionally, the processing system may be a series of networked computers. Further, the use of different micro processors is contemplated, such as Pentium™ or Itanium™ microprocessors; Opteron™ or AthlonXP™ microprocessors from Advanced Micro Devices, Inc., and the like. Further, use of different types of operating systems is contemplated, such as Windows®, WindowsXP®, WindowsNT®, or the like from Microsoft Corporation, Solaris from Sun Microsystems, LINUX, UNIX, and the like.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. A tangible computer readable storage medium storing thereon a set of instructions which when executed by a processor cause the processor to create a dynamic atomic bitset object, the dynamic atomic bitset object comprising:
   an array object including:
   a pointer to a previous array object; and
   an atomic integer array object, wherein the number of bits in the dynamic atomic bitset object is dynamically changeable and the dynamic atomic bitset object is concurrently accessible by multiple threads without requiring the use of locks;
   the tangible computer readable storage medium comprising instructions for resizing the dynamic atomic bitset object which cause the processor to:
   create a new array object;
   store a pointer to the array object as the previous pointer of the new array object;
   copy each required element of the atomic integer array object to the new atomic integer array object using a compare and swap operation;
   set a copied indicator bit in each element of the atomic integer array object using the compare and swap operation; and
   replace the array object with the new array object using the compare and swap operation;
   wherein the steps of storing and replacing are repeated upon a failure of the compare and swap operation.

2. The tangible computer readable storage medium of claim 1, wherein the steps of copying each required element and setting a copied indicator bit are repeated upon failure of the compare and swap operation.

3. The tangible computer readable storage medium of claim 2, wherein the new array object is larger than the array object.

4. The tangible computer readable storage medium of claim 2 further comprising setting a snapshot pointer to point to the array object once each required element of the array object has been copied to the new array object.

5. The tangible computer readable storage medium of claim 4, wherein the array object pointed to by the snapshot pointer is only accessible by a single thread.

6. The tangible computer readable storage medium of claim 5, wherein the elements of the atomic integer array are not altered prior to setting the snapshot pointer with the exception of the copied indicator bit.

7. The tangible computer readable storage medium of claim 2 further comprising:
   receiving an instruction to retrieve a specific bit offset of the dynamic atomic bitset object;
   determining an element of the atomic integer array object that stores the specific bit offset;
   retrieving the element from the atomic integer array object;
   returning a value of the specific bit offset from the new atomic integer array object if the copied indicator bit of the element is set; and
   copying the element from the atomic integer array object to the new atomic integer array object and setting the copied indicator bit of the element in the atomic integer array object if the copied indicator bit of the element is not set.

8. The tangible computer readable storage medium of claim 1, wherein each element of the atomic integer array object stores at least two bits of the dynamic atomic bitset.

9. A system for creating a dynamic atomic bitset object comprising:
   a memory for storing instructions for creating the dynamic atomic bitset object and for resizing the dynamic atomic bitset object; and
   a processor coupled to the memory, wherein the processor is configured to execute the instructions to create a dynamic atomic bitset object comprising:
   an array object including:
   a pointer to a previous array object; and
   an atomic integer array object, wherein the number of bits in the dynamic atomic bitset object is dynamically changeable and the dynamic atomic bitset object is concurrently accessible by multiple threads without requiring the use of locks; and
   wherein the processor is configured to execute the instructions for resizing the dynamic atomic bitset object to:
   create a new array object;
   store a pointer to the array object as the previous pointer of the new array object;
   copy each required element of the atomic integer array object to the new atomic integer array object using a compare and swap operation;
   set a copied indicator bit in each element of the atomic integer array object using the compare and swap operation; and
   replace the array object with the new array object using the compare and swap operation;
   wherein the steps of storing and replacing are repeated upon a failure of the compare and swap operation.

10. The system of claim 9 wherein the memory further comprises instructions to cause the processor to:
    receive an instruction to retrieve a specific bit offset of the dynamic atomic bitset object;
    determine an element of the atomic integer array object that stores the specific bit offset;
    retrieve the element from the atomic integer array object;
    return a value of the specific bit offset from the new atomic integer array object if the copied indicator bit of the element is set; and
    copy the element from the atomic integer array object to the new atomic integer array object and setting the copied indicator bit of the element in the atomic integer array object if the copied indicator bit of the element is not set.

11. A computer implemented method of using a dynamic atomic array object comprising:
    creating a dynamic atomic bitset object, the dynamic atomic bitset object including an array object, a pointer to a previous array object, and an atomic integer array object, wherein the number of bits in the dynamic atomic bitset object is dynamically changeable and the dynamic atomic bitset object is concurrently accessible by multiple threads without requiring the use of locks;
    creating a new array object;
    storing a pointer to the array object as the previous pointer of the new array object; and
    replacing the array object with the new array object using a compare and swap operation;
    copying each required element of the atomic integer array object to the new atomic integer array object using the compare and swap operation; and
    setting a copied indicator bit in each element of the atomic integer array object using the compare and swap operation;
    wherein the steps of storing and replacing are repeated upon a failure of the compare and swap operation.

12. The computer implemented method of claim 11 further comprising:
    receiving an instruction to retrieve a specific bit offset of the dynamic atomic bitset object;
    determining an element of the atomic integer array object that stores the specific bit offset;
    retrieving the element from the atomic integer array object;
    returning a value of the specific bit offset from the new atomic integer array object if the copied indicator bit of the element is set; and
    copying the element from the atomic integer array object to the new atomic integer array object and setting the copied indicator bit of the element in the atomic integer array object if the copied indicator bit of the element is not set.

* * * * *

UNITED STATES PATENT AND TRADEMARK OFFICE
CERTIFICATE OF CORRECTION

PATENT NO. : 8,417,733 B2  
APPLICATION NO. : 12/717917  
DATED : April 9, 2013  
INVENTOR(S) : Reynolds Page 1 of 1

It is certified that error appears in the above-identified patent and that said Letters Patent is hereby corrected as shown below:

In the Specification

In column 12, line 48, delete "indictor" and insert -- indicator --, therefor.

In column 18, line 11, delete "indictor" and insert -- indicator --, therefor.

In column 20, line 43, delete "indictor" and insert -- indicator --, therefor.

In column 21, line 66, delete "then" and insert -- than --, therefor.

In column 22, line 25, delete "then" and insert -- than --, therefor.

In column 23, line 5, delete "Empty( )method." and insert -- Empty( ) method. --, therefor.

In column 23, line 64, delete "clone( )method" and insert -- clone( ) method --, therefor.

Signed and Sealed this  
Sixth Day of August, 2013

Teresa Stanek Rea  
*Acting Director of the United States Patent and Trademark Office*